US012618584B2

(12) United States Patent
Wang et al.

(10) Patent No.: US 12,618,584 B2
(45) Date of Patent: May 5, 2026

(54) GAIN-SCHEDULING SYSTEM AND METHOD FOR IMPROVING FAN SPEED CONTROL IN AIR HANDLING UNITS

(71) Applicants: The Board of Regents of the University of Oklahoma, Norman, OK (US); University of Miami, Miami, FL (US)

(72) Inventors: Gang Wang, Palmetto Bay, FL (US); Li Song, Norman, OK (US); Zufen Wang, Miami, FL (US); Rodney D. Hurt, Norman, OK (US)

(73) Assignees: The Univeristy of Miami, Miami, FL (US); The Board of Regents of the University of Oklahoma, Norman, OK (US)

( * ) Notice: Subject to any disclaimer, the term of this patent is extended or adjusted under 35 U.S.C. 154(b) by 463 days.

(21) Appl. No.: 18/165,686

(22) Filed: Feb. 7, 2023

(65) Prior Publication Data

US 2023/0250989 A1     Aug. 10, 2023

Related U.S. Application Data

(60) Provisional application No. 63/307,386, filed on Feb. 7, 2022.

(51) Int. Cl.
*F24F 11/77*     (2018.01)
*F24F 11/46*     (2018.01)
*F24F 11/63*     (2018.01)

(52) U.S. Cl.
CPC .............. *F24F 11/77* (2018.01); *F24F 11/46* (2018.01); *F24F 11/63* (2018.01); *G05B 2219/2614* (2013.01)

(58) Field of Classification Search
CPC . F24F 11/77; F24F 11/46; F24F 11/63; G05B 2219/2614
See application file for complete search history.

(56) References Cited

U.S. PATENT DOCUMENTS

2008/0139105 A1*  6/2008  Kuentz ................... F24F 11/77
                                                            454/238
2016/0341439 A1*  11/2016  Karamanos .......... G05D 7/0635

* cited by examiner

*Primary Examiner* — Michael W Choi
(74) *Attorney, Agent, or Firm* — DUNLAP CODDING, P.C.

(57)     ABSTRACT

The present disclosure describes a system comprising a gain-scheduling control strategy which improves its nonlinear control performance. A control-oriented model, which does not require numerous physical parameters and extensive test data, has been developed to address the nonlinearity of the fan system. Based on theoretical model and experimental verifications, the issue of an aggressive response with a conventional fixed-gain controller is caused by the fact that the system gain is proportional to the ratio of the duct static pressure to the fan speed. To address the issue, a scheduling function of the measurable duct static pressure and fan speed is included in the conventional fixed-gain controller to compensate for the fan system gain variation. The gain-scheduling control strategy approximately maintains the identical control performance under all operation conditions. The gain-scheduling control strategy can be readily implemented on a processor without intensive computation and additional measurements.

19 Claims, 7 Drawing Sheets

GAIN-SCHEDULING SYSTEM AND METHOD FOR IMPROVING FAN SPEED CONTROL IN AIR HANDLING UNITS

CROSS-REFERENCE TO RELATED APPLICATIONS

This patent application claims priority to U.S. Ser. No. 63/307,386, filed on Feb. 7, 2022, the entire content of which is hereby incorporated herein by reference.

STATEMENT OF GOVERNMENT INTEREST

This invention was made with government support under Contract Number DE-EE0008683 awarded by the US Department of Energy (DOE). The government has certain rights in the Invention.

BACKGROUND ART

Ventilation energy, which is mainly consumed by the fans in heating, ventilation and air-conditioning systems, accounts for approximately 15.9% of the electricity consumption in commercial buildings in the U.S. (DOE 2011, Zhou, Harberl et al. 2017). Variable air volume (VAV) systems, with adjustable supply fan speed, have gained popularity in air handling units (AHUs) because of their potential to help achieve energy efficiency.

Traditionally, the supply fan speed control system in an AHU is a single control loop system in which the supply fan speed is modulated by the variable frequency drive (VFD) to maintain the duct static pressure setpoint. A nonlinear relationship among the fan speed, airflow rate, and duct static pressure has been identified in numerous experiments (Zaheer-Uddin and Zheng 1994, Mei and Levermore 2002, Wang and Wang 2008), indicating a nonlinear feature of the fan speed control system. On the other hand, the duct static pressure reset in VAV systems has proven to be energy efficient with an energy savings of 30%-50% by supply fans compared with the constant static pressure control strategy (Taylor 2007, Shim, Song et al. 2014) and is required for systems with direct digital control (DDC) at the zone level (ASHRAE 2010). As a result, the dynamical reset of static pressure setpoints will significantly change the fan operation conditions. Moreover, the increasing deployment of occupancy sensors in commercial buildings increases the dynamical reset of the terminal box (TB) minimum airflow setpoints (Esrafilian-Najafabadi and Haghighat 2021), resulting in dynamically variable TB damper positions. Variable TB damper positions will, in turn, affect the duct static pressure, creating disturbances on the fan speed control system and on variable operation conditions.

Due to its nonlinear feature, the frequently variable operation conditions and external disturbances, coupled with system interactions, make the fan control system design and operation a significant challenge (Mei and Levermore 2000). To achieve good operation performance in addition to low energy cost, it is critical to apply more effective control strategies to the fan speed control system to handle these nonlinearities. To do so, the fan speed control system model needs to be developed and the main factors that cause the nonlinearities have to be identified.

Zaheer-Uddin and Zheng (Zaheer-Uddin and Zheng 1994) built a fan speed control system model through theoretical analysis by using nonlinear time-varying equations. However, the theoretical model is complicated, and numerous system operation parameters are required, which is generally not feasible in practice. Mei and Levermore (Mei and Levermore 2002) developed a nonlinear dynamic fan model by combining the artificial neural network (ANN)—trained fan performance curves and a first-order equation with different time constants at various operation conditions. While the model is able to reproduce the trend in fan control performance, the accuracy, especially for closed-loop control systems, is limited and large datasets have to be collected to train the model, which is costly and time consuming. Similarly, Raisoni, Raman et al. (Raisoni, Raman et al. 2018) developed a low order control-oriented model to predict the fan airflow rate in response to changes in fan speed and damper positions by introducing the dynamics into the steady-state functions.

The control-oriented model is aimed at real-time control computations. While the model can be used for control system design, a variety of tests have to be conducted to calibrate the unknown parameters. Wang and Wang (Wang and Wang 2008) pointed out the difficulty in establishing the theoretical fan speed control system model. They obtained the relationship among the fan speed, airflow rate and duct static pressure through experimental methods by measuring the duct static pressure variation as the fan airflow rate is changed under different fan speeds while the time constant of the system response is neglected. In conclusion, the fan speed control system models built above are computationally complicated and time-consuming. In addition, none of the studies have explicitly pointed out the component gain variations under various operation conditions, and the key factors that impact the system nonlinear control performance still remain unknown.

On the other hand, the controller designed for a traditional fan speed control system is a Proportional-Integral-Derivative (PID) controller with fixed gains. With such a controller, the nonlinear system can become sluggish or oscillatory when its operation condition deviates significantly from the condition where the controller is tuned (Singhal and Salsbury 2007). Specifically, the system can experience instability when it operates at low load conditions if the controller is tuned at high load conditions, while the system can behave sluggishly at high load conditions if the controller is tuned at low load conditions (Underwood 2002, Moradi, Saffar-Avval et al. 2011, Price and Rasmussen 2015). Mei and Levermore (Mei and Levermore 2000) investigated the range of stability for the gains of the Proportional-Integral (PI) controller of a nonlinear fan speed control system with all the component gains and time constants fixed under various operation conditions. The experiments showed that the gains of the PI controller have a larger stable range with a higher airflow rate, indicating that the system nonlinear control performance can be impacted by the airflow rate, and the system can become unstable with a low airflow rate with a fixed duct static pressure. In fact, undesired oscillations have often been observed in fan speed control systems. Tests conducted on ten AHUs resulted in oscillations in 22% of the supply fans for 6%-26% of their operating time (Chintala, Price et al. 2015). While the oscillations can result in higher supply fan energy consumption, thermal comfort complaint and device wear, more effective and practical control strategies are desired to handle the control issues caused by the system nonlinearities.

Optimal, predictive, and adaptive controllers have been studied extensively to resolve the nonlinearities of the control systems. However, while these controllers are considered cutting-edge, the applications of them in practice in the replacement of PID controllers are impeded by their intensive computation and complex control algorithm (Okochi and Yao 2016).

Gain-scheduling control, as one type of adaptive control strategy, is a popular solution to nonlinear control design problems with a large range of operation condition variations and system nonlinearities for its inherited benefits of PID controller with intuitive design. Classical gain-scheduling control depends on the dynamic characteristics of a nonlinear system, which can be described as a combination of a family of linear time invariant (LTI) systems and the local controllers tuned based on the LTI system under the current operation conditions. Shin, Chang et al and Moradi, Saffar-Avval et al (Shin, Chang et al. 2002, Moradi, Saffar-Avval et al. 2011) both applied the classical gain-scheduling control strategy to the control system in an AHU and achieved better control performance and less energy consumption. Wu, Li et al (Wu, Li et al. 2019) designed a gain-scheduling controller based on active disturbance rejection control for thermal power plant under full operation conditions. However, there are some drawbacks of classical gain-scheduling control. It requires accurate LTI models for linear controller design, which may be difficult or even infeasible to obtain for some systems. On the other hand, it may result in unsatisfactory or even unstable control performance for systems with rapid parameters change. To handle the limitations of classical gain-scheduling control, gain-scheduling synthesizing adaptive fuzzy control, model predictive control (MPC) and neural network (Yang and Yan 2016, Barbosa, Bertolin et al. 2018, Ghefiri, Garrido et al. 2018, Yueneng and Ye 2018, Eltayeb, Rahmat et al. 2019, Gallego, Merello et al. 2019) has been studied to optimize the control performance and improve the robustness without the need of the LTI models. However, the gain-scheduling control strategies found in literature either require multiple controllers tuning or complex control algorithm design, which can be computationally complicated and their practical application is limited (Afram and Janabi-Sharifi 2014). In addition, they can only achieve local desired performance while the global performance and stability cannot be guaranteed (Naus 2009). In contrast, the linear parameter varying (LPV) model-based gain-scheduling control can avoid the model linearization and multiple controller tuning processes in addition to its prior guarantees of stability and performance specifications (Naus 2009), which has also been applied in many fields. Tahersima, Stoustrup et al. (Tahersima, Stoustrup et al. 2013) designed a gain-scheduling controller based on the developed LPV model of radiator dynamics. In their study, the LPV model was developed with the radiator gain and the time constant derived as a function of the hot water flow rate and room air temperature, based on which the scheduling function is designed to compensate the variable dynamics and transform the nonlinear system into a LTI system, which is independent of the operation conditions.

BRIEF DESCRIPTION OF THE DRAWINGS

Several embodiments of the present disclosure are hereby illustrated in the appended drawings. It is to be noted however, that the appended drawings only illustrate several embodiments and are therefore not intended to be considered limiting of the scope of the present disclosure.

plotted vs. fan-duct gain.

Figure 4:
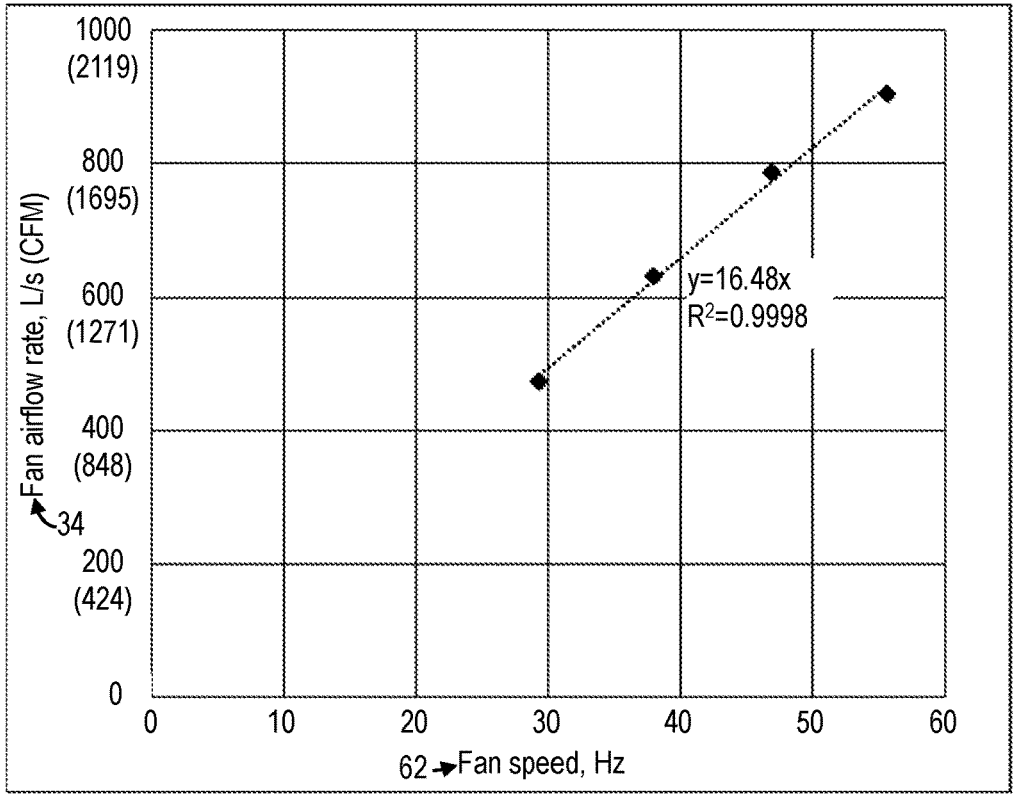

FIG. 4 is a graph showing fan speed plotted vs. fan airflow rate.

Figure 5:
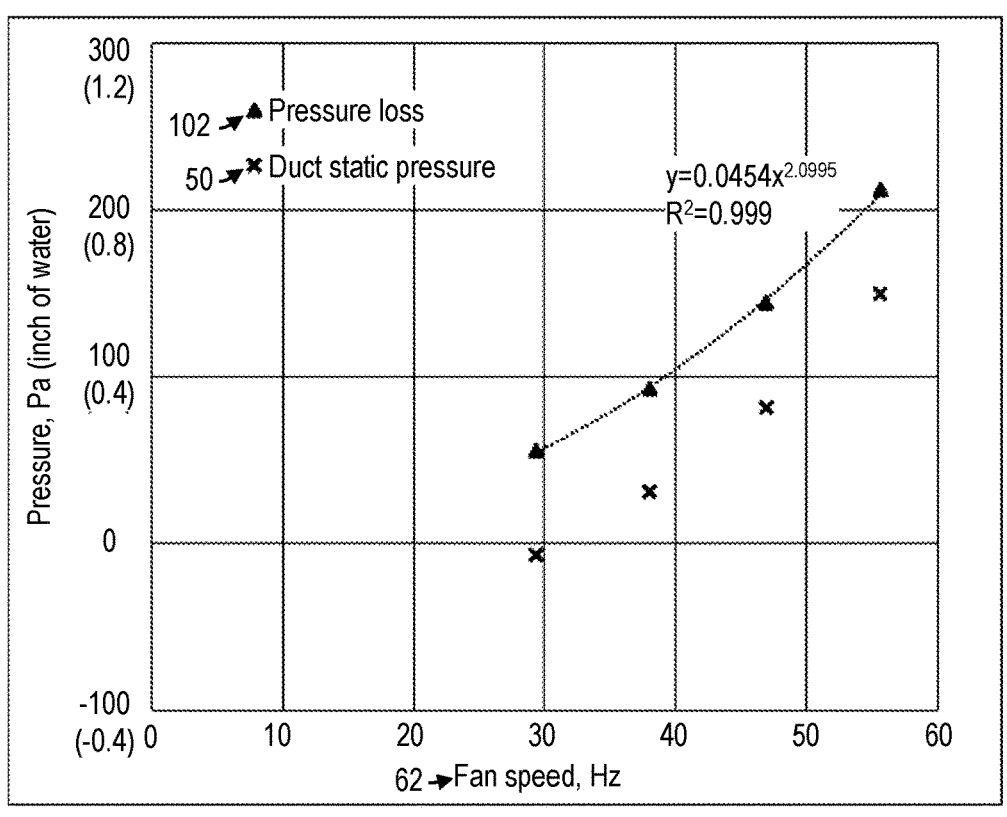

FIG. 5 is a graph showing fan speed vs. pressure loss of the downstream ducts.

Figure 6:
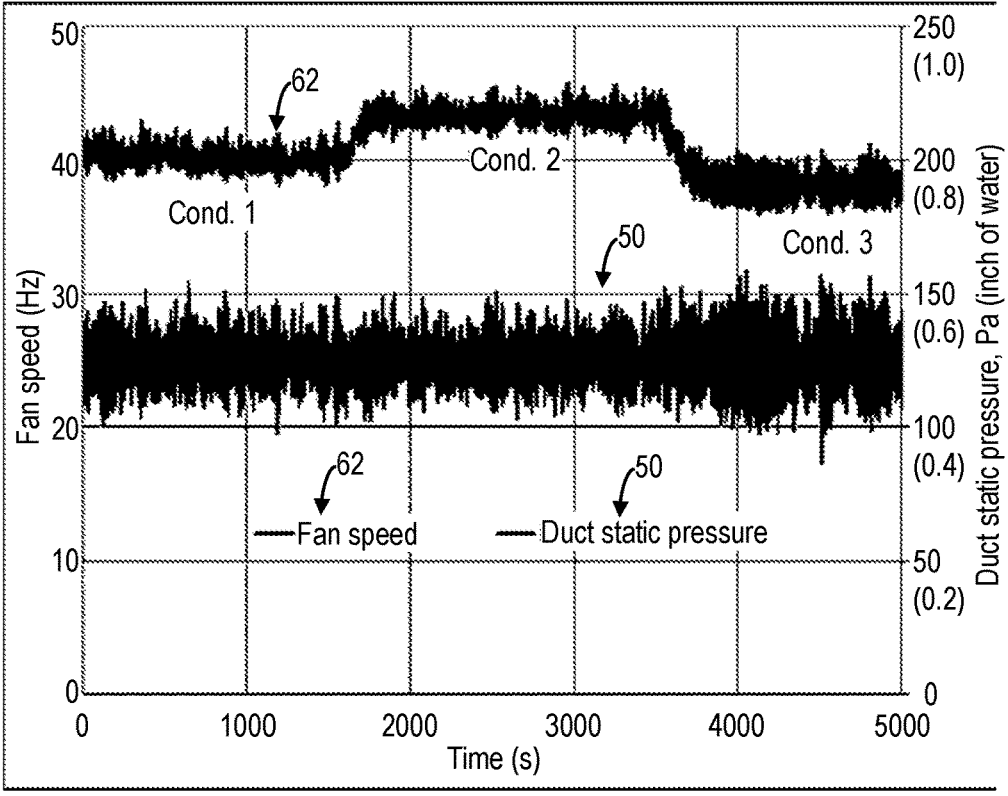

FIG. 6 shows system response of fan speed and duct static pressure with variable fan speed.

Figure 7:
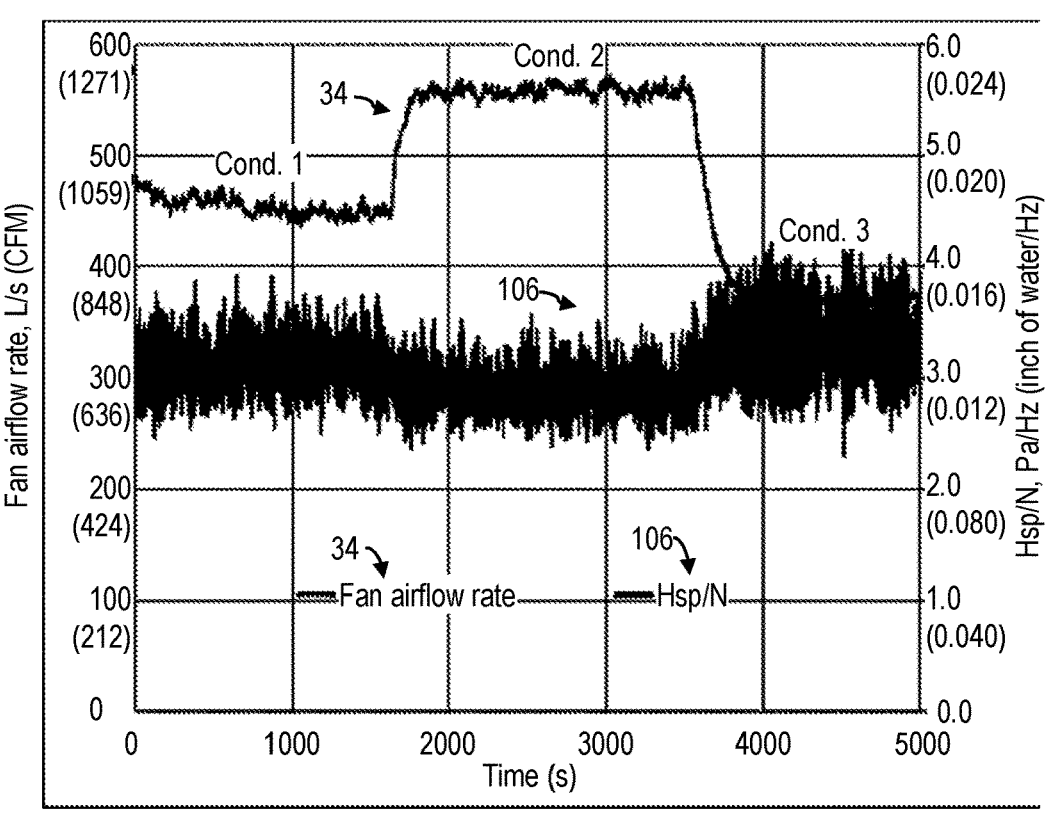

FIG. 7 shows fan airflow rate and $$\frac{H_{sp}}{N}$$

with variable fan speed.

Figure 8:
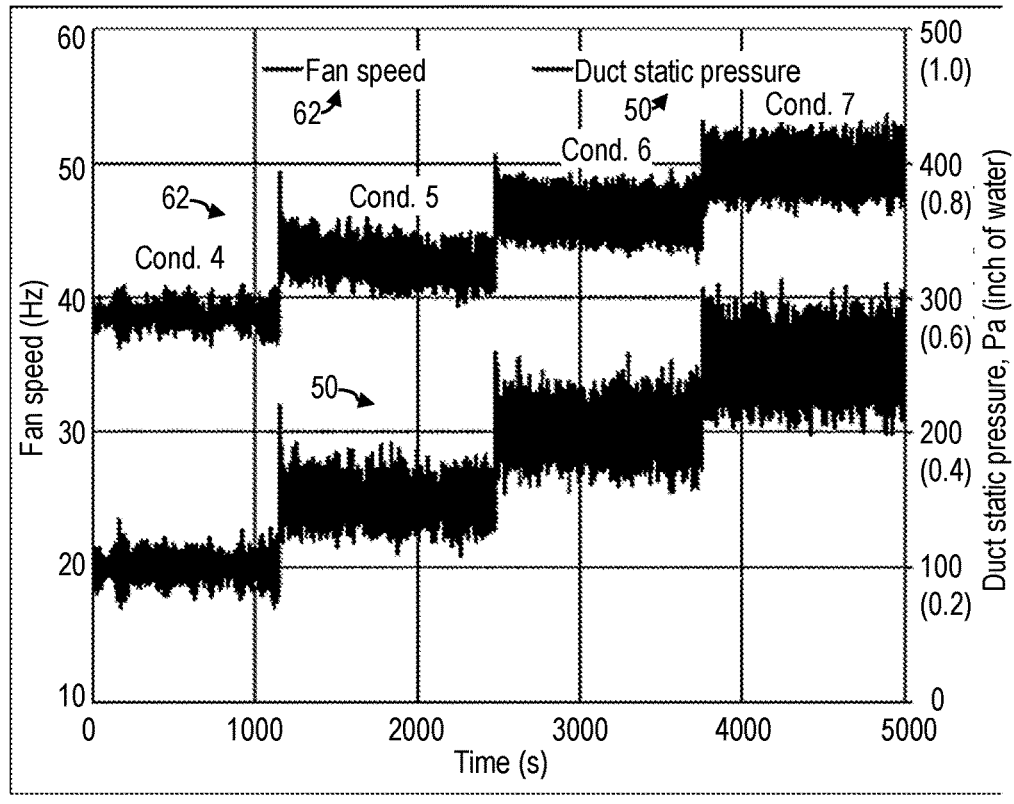

FIG. 8 shows system response of fan speed and duct static pressure with variable duct static pressure.

Figure 9:
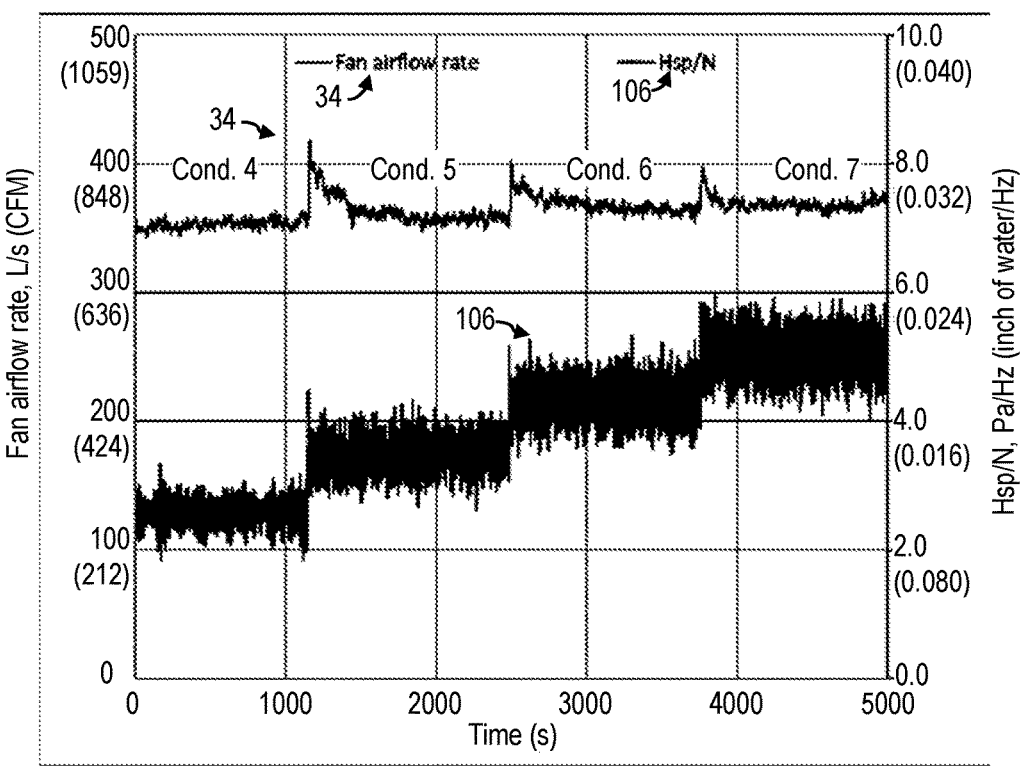

FIG. 9 shows fan airflow rate and $$\frac{H_{sp}}{N}$$

with variable duct static pressure.

Figure 10:
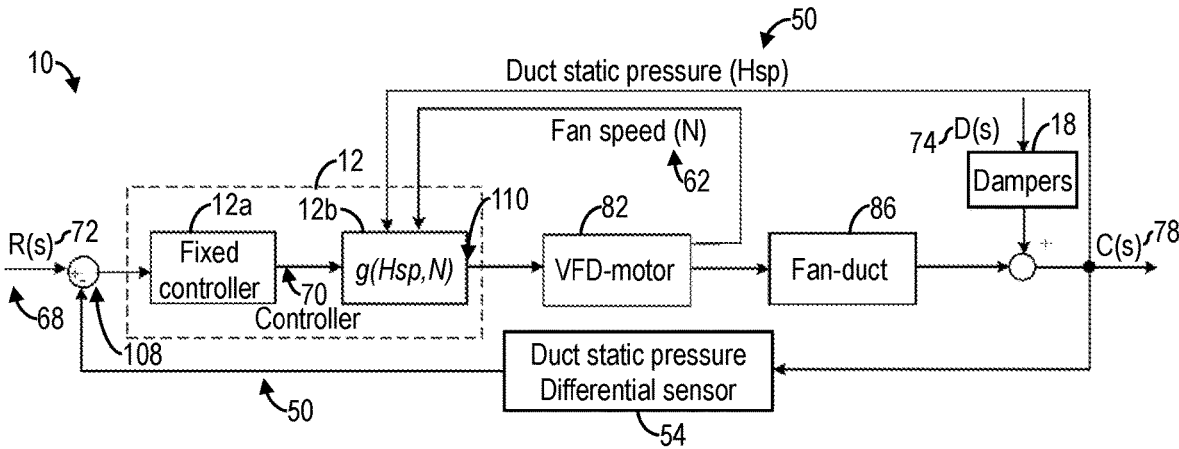

FIG. 10 shows a block diagram of gain-scheduling fan speed control.

Figure 11A:
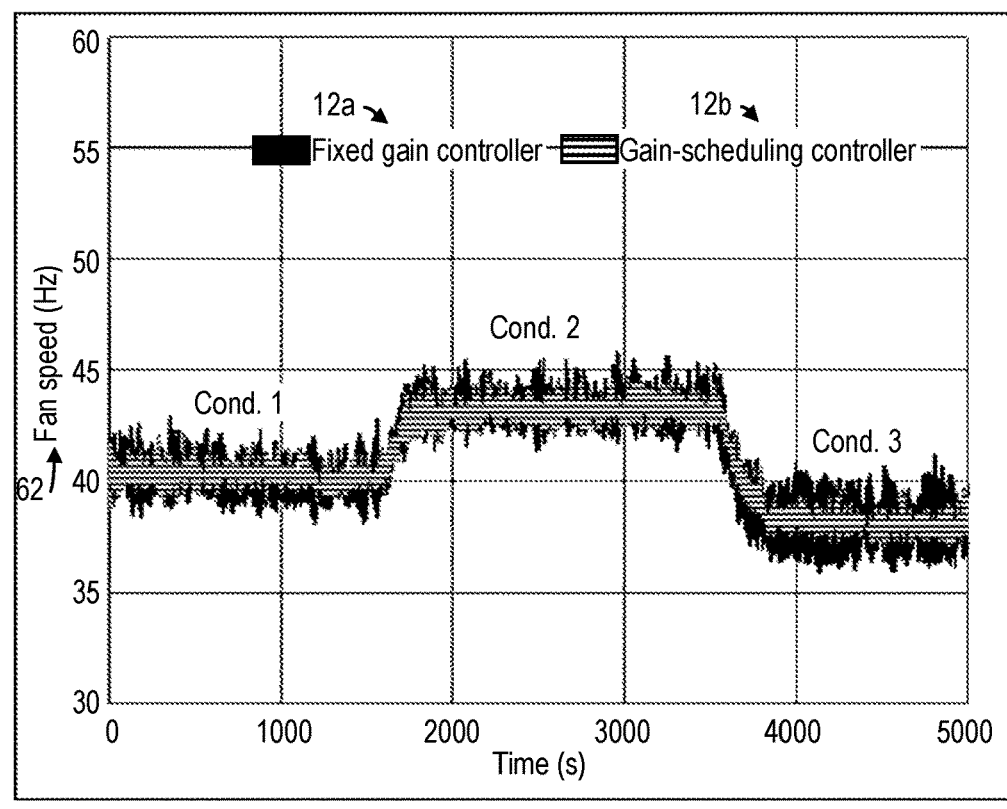

FIG. 11A shows system response of fan speed with variable fan speed using the fixed-gain controller and gain-scheduling controller.

Figure 11B:
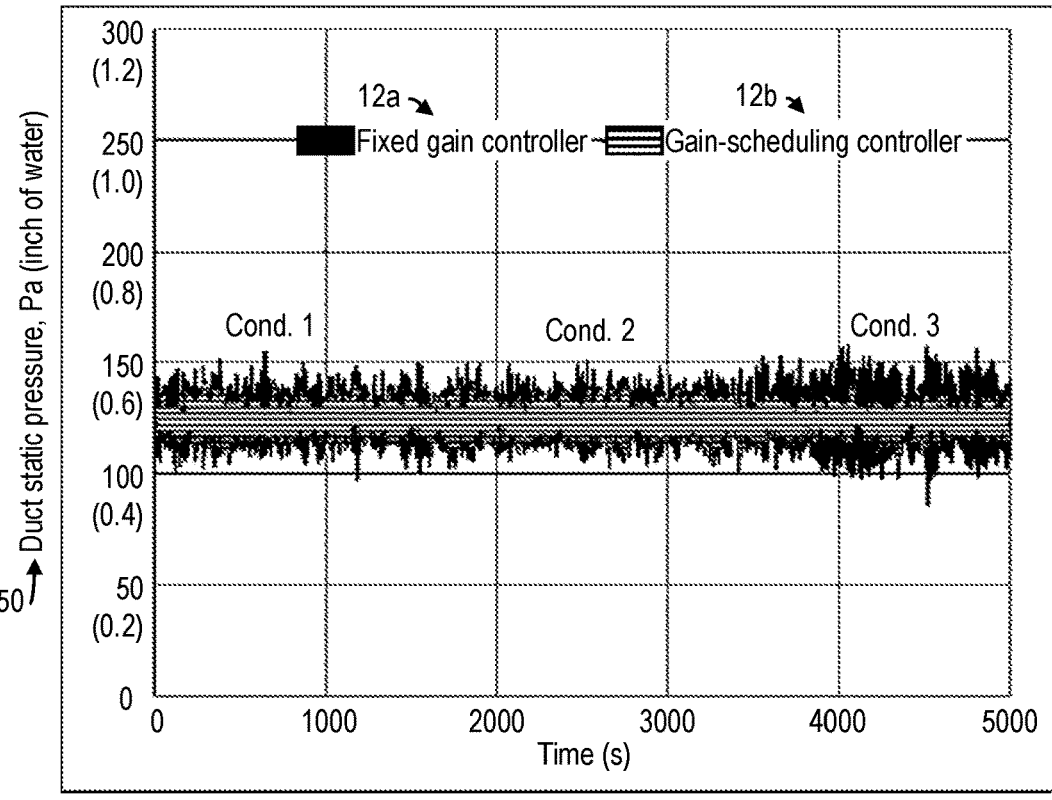

FIG. 11B shows system response of duct static pressure with variable fan speed using the fixed-gain controller and gain-scheduling controller.

Figure 12A:
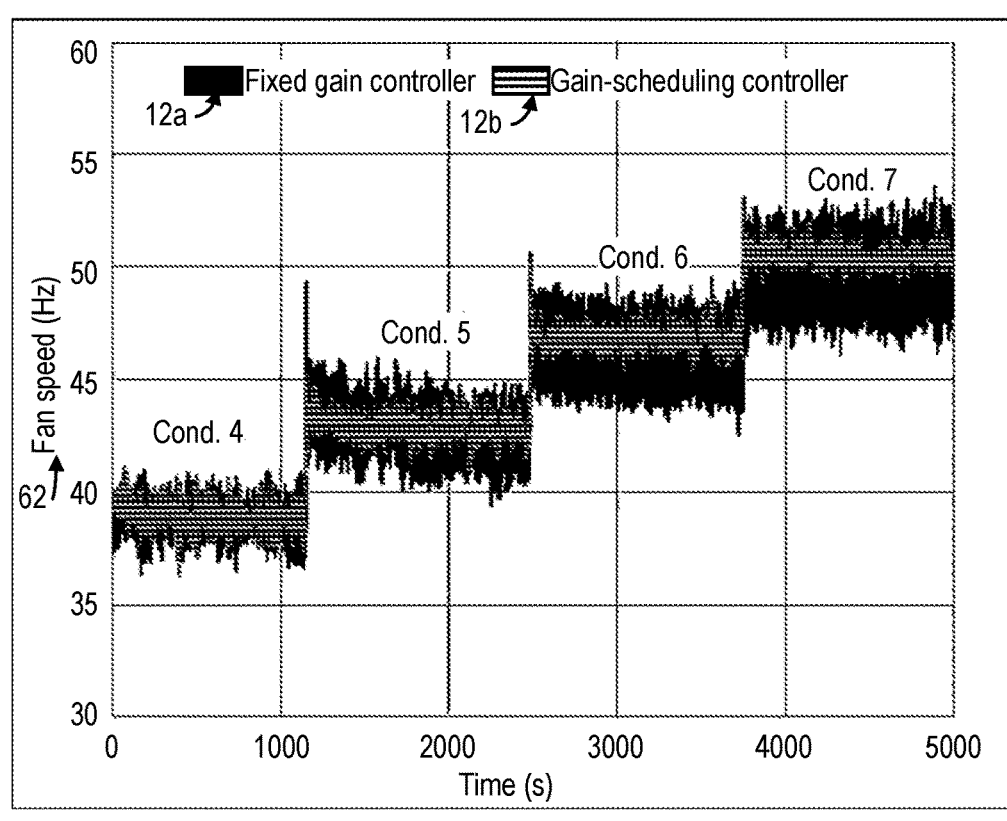

FIG. 12A shows system response of fan speed with variable duct static pressure using the fixed-gain controller and gain-scheduling controller.

Figure 12B:
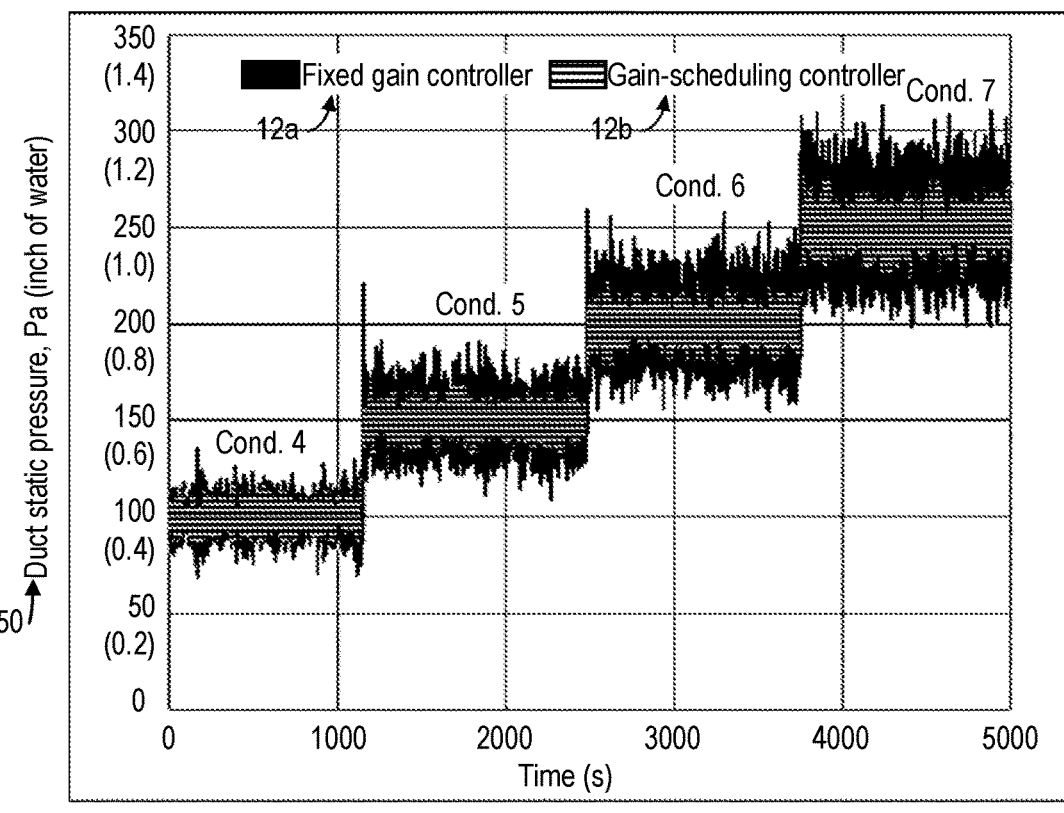

FIG. 12B shows system response of duct static pressure using the fixed gain controller and gain-scheduling controller.

DETAILED DESCRIPTION

Nomenclature

CO=VFD frequency command
D=disturbance input
H=pressure (Pa, inch of water)
I=integral
K=gain (%/Pa (%/inch of water), Hz/%, Pa/Hz (inch of water/Hz))
G=transfer function
LPV: linear parameter varying
N=fan speed (Hz)
P=proportional
r=reference condition
R=reference input
S=resistance coefficient (Pa/(L/s)$^2$, inch of water/CFM$^2$)
$\alpha$, $\beta$=ratio
$\tau$=time constant (s)

Subscripts and Superscripts

C=controller
D=design

5 fd=fan-duct j=jth sample n=total number of samples sp=static pressure

TB=terminal box

Vm=VFD-motor

While the LPV model-based gain-scheduling control shows attractive superiority, the availability of the LPV model presents the most challenges for its application. As a result, the promising gain-scheduling control approach has never been studied in fan speed control systems due to the lack of simple enough LPV model. Therefore, the present disclosure provides an efficient yet effective control algorithm for fan speed control systems, which can explicitly express the system nonlinearities with readily available operation parameters, paving the way for the LPV model-based gain-scheduling control scheme.

A physical model and experimental results show that the fan-duct component is the major nonlinear component of an air handling unit, and its gain varies with the fan operation condition. A major correlation has been investigated and validated that the fan-duct gain is proportional to the ratio of the duct static pressure to the fan speed. A gain-scheduling controller is then developed to compensate the fan-duct gain variation by adding a scheduling function, which can be determined based on the measurable duct static pressure and fan speed.

In particular, the system described herein employs a gain-scheduling control strategy, which can be readily implemented without additional cost, to improve the nonlinear control performance of the fan speed control system at AHUs under variable operation conditions. First, a control-oriented model of the fan speed control system is developed and calibrated, which correlates the fan system gain to the readily measurable duct static pressure and fan speed to identify the fan system nonlinearity. Then, with the developed model and experimental results, the issue of an aggressive response with a fixed-gain controller is identified under the operation conditions with a higher fan system gain, which does not meet the design conditions. Finally, a gain-scheduling control strategy is developed by adding a gain-scheduling function using the measurable duct static pressure and fan speed to compensate for the variable fan system gain, and the control performance improvement is validated by experiments.

Before describing various embodiments of the present disclosure in more detail by way of exemplary description, examples, and results, it is to be understood that the embodiments of the present disclosure are not limited in application to the details of methods and compositions as set forth in the following description. The embodiments of the present disclosure are capable of other embodiments or of being practiced or carried out in various ways. As such, the language used herein is intended to be given the broadest possible scope and meaning; and the embodiments are meant to be exemplary, not exhaustive. Also, it is to be understood that the phraseology and terminology employed herein is for the purpose of description and should not be regarded as limiting unless otherwise indicated as so. Moreover, in the following detailed description, numerous specific details are set forth in order to provide a more thorough understanding of the disclosure. However, it will be apparent to a person having ordinary skill in the art that the presently disclosed inventive concepts may be practiced without these specific details. In other instances, features which are well known to persons of ordinary skill in the art have not been described in detail to avoid unnecessary complication of the description.

Unless otherwise defined herein, scientific and technical terms used in connection with the embodiments of the present disclosure shall have the meanings that are commonly understood by those having ordinary skill in the art. Further, unless otherwise required by context, singular terms shall include pluralities and plural terms shall include the singular.

All patents, published patent applications, and non-patent publications mentioned in the specification are indicative of the level of skill of those skilled in the art to which embodiments of the present disclosure pertain. All patents, published patent applications, and non-patent publications referenced in any portion of this application are herein expressly incorporated by reference in their entirety to the same extent as if each individual patent or publication was specifically and individually indicated to be incorporated by reference.

While the apparatus and methods of the embodiments of the present disclosure have been described in terms of particular embodiments, it will be apparent to those of skill in the art that variations may be applied to the apparatus and/or methods and in the steps or in the sequence of steps of the method described herein without departing from the spirit and scope of the inventive concepts. All such similar substitutes and modifications apparent to those of skilled in the art are deemed to be within the spirit and scope of the inventive concepts as defined herein.

As utilized in accordance with the apparatus and methods of the embodiments of the present disclosure, the following terms, unless otherwise indicated, shall be understood to have the following meanings:

The use of the word "a" or "an" when used in conjunction with the term "comprising" in the claims and/or the specification may mean "one," but it is also consistent with the meaning of "one or more," "at least one," and "one or more than one." The use of the term "or" in the claims is used to mean "and/or" unless explicitly indicated to refer to alternatives only or when the alternatives are mutually exclusive, although the disclosure supports a definition that refers to only alternatives and "and/or." The use of the term "at least one" will be understood to include one as well as any quantity more than one, including but not limited to, 2, 3, 4, 5, 6, 7, 8, 9, 10, 15, 20, 30, 40, 50, 100, or any integer inclusive therein. The term "at least one" may extend up to 100 or 1000 or more, depending on the term to which it is attached; in addition, the quantities of 100/1000 are not to be considered limiting, as higher limits may also produce satisfactory results. In addition, the use of the term "at least one of X, Y and Z" will be understood to include X alone, Y alone, and Z alone, as well as any combination of X, Y and Z.

As used in this specification and claim(s), the words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps.

The term "or combinations thereof" as used herein refers to all permutations and combinations of the listed items preceding the term. For example, "A, B, C, or combinations thereof" is intended to include at least one of: A, B, C, AB, AC, BC, or ABC, and if order is important in a particular context, also BA, CA, CB, CBA, BCA, ACB, BAC, or CAB. Continuing with this example, expressly included are combinations that contain repeats of one or more item or term, such as BB, AAA, AAB, BBC, AAABCCCC, CBBAAA, CABABB, and so forth. The skilled artisan will understand that typically there is no limit on the number of items or terms in any combination, unless otherwise apparent from the context.

Throughout this application, the term "about" or "approximately" is used to indicate that a value includes the inherent variation of error. Further, in this detailed description, each numerical value (e.g., time or frequency) should be read once as modified by the term "about" (unless already expressly so modified), and then read again as not so modified unless otherwise indicated in context. The use of the term "about" or "approximately" may mean a range including ±1%, or ±5%, or ±10%, or ±15%, or ±25% of the subsequent number unless otherwise stated.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Also, any range listed or described herein is intended to include, implicitly or explicitly, any number within the range, particularly all integers, including the end points, and is to be considered as having been so stated. For example, "a range from 1 to 10" is to be read as indicating each possible number, particularly integers, along the continuum between about 1 and about 10. Thus, even if specific data points within the range, or even no data points within the range, are explicitly identified or specifically referred to, it is to be understood that any data points within the range are to be considered to have been specified, and that the inventors possessed knowledge of the entire range and the points within the range. Thus, to illustrate, reference to a numerical range, such as 1-10 includes 1, 2, 3, 4, 5, 6, 7, 8, 9, 10, as well as 1.1, 1.2, 1.3, 1.4, 1.5, etc., and so forth. Reference to a range of 1-50 therefore includes 1, 2, 3, 4, 5, 6, 7, 8, 9, 10, 11, 12, 13, 14, 15, 16, 17, 18, 19, 20, etc., up to and including 50, as well as 1.1, 1.2, 1.3, 1.4, 1.5, etc., 2.1, 2.2, 2.3, 2.4, 2.5, etc., and so forth. Reference to a series of ranges includes ranges which combine the values of the boundaries of different ranges within the series. Thus, to illustrate reference to a series of ranges, for example, of 1-10, 10-20, 20-30, 30-40, 40-50, 50-60, 60-75, 75-100, 100-150, 150-200, 200-250, 250-300, 300-400, 400-500, 500-750, 750-1, 000, includes ranges of 1-20, 10-50, 50-100, 100-500, and 500-1,000, for example.

As noted above, any numerical range listed or described herein is intended to include, implicitly or explicitly, any number or sub-range within the range, particularly all integers, including the end points, and is to be considered as having been so stated. For example, "a range from 1.0 to 10.0" is to be read as indicating each possible number, including integers and fractions, along the continuum between and including 1.0 and 10.0, that is, having a minimum value equal to or greater than 1.0 and a maximum value equal to or less than 10.0, such as, for example, 3.25 to 8.65. Any maximum numerical limitation recited herein is intended to include all lower numerical limitations subsumed therein, and any minimum numerical limitation recited in this specification is intended to include all higher numerical limitations subsumed therein. Accordingly, Applicant reserves the right to amend this specification, including the claims, to expressly recite any sub-range subsumed within the ranges expressly recited herein. Thus, even if specific data points within the range, or even no data points within the range, are explicitly identified or specifically referred to, it is to be understood that any data points within the range are to be considered to have been specified, and that the inventors possessed knowledge of the entire range and the points within the range.

As used herein, the term "substantially" means that the subsequently described parameter, event, or circumstance completely occurs, or that the subsequently described parameter, event, or circumstance occurs to a great extent or degree. For example, the term "substantially" means that the subsequently described parameter, event, or circumstance occurs at least 90% of the time, or at least 91%, or at least 92%, or at least 93%, or at least 94%, or at least 95%, or at least 96%, or at least 97%, or at least 98%, or at least 99%, of the time, or means that the dimension or measurement is within at least 90%, or at least 91%, or at least 92%, or at least 93%, or at least 94%, or at least 95%, or at least 96%, or at least 97%, or at least 98%, or at least 99%, of the referenced dimension or measurement.

Circuitry, as used herein, may be analog and/or digital components, or one or more suitably programmed processors (e.g., microprocessors) and associated hardware and software, or hardwired logic. Also, "components" may perform one or more functions. The term "component" may include hardware, such as a processor (e.g., microprocessor), and application specific integrated circuit (ASIC), field programmable gate array (FPGA), a combination of hardware and software, and/or the like. The term "processor" as used herein means a single processor or multiple processors working independently or together to collectively perform a task.

In certain embodiments, the system 10 comprises a controller 12 having a component or components that are able to embody and/or execute the logic of the processes described herein. Logic embodied in the form of software instructions and/or firmware may be executed on appropriate hardware. For example, logic embodied in the form of software instructions or firmware may be executed on a computer system, a distributed processing system, and/or the like. In some embodiments, the logic may be implemented in a stand-alone environment operating on a single processor, and/or logic may be implemented in a networked environment, such as a distributed system using multiple processors. To that end, one or more elements of logic embodied in the form of software instructions or firmware may be executed in a stand-alone environment and one or more elements of the logic may be executed in the distributed system.

The controller 12 may include at least one component comprising one or more processors configured to communicate with sensors, motors, valves, and pressure sensors to receive inputs signals from the HVAC system and provide one or more signal outputs. The one or more processors may work together, or independently to execute processor executable code. Additionally, the controller 12 may include one or more memories capable of storing processor executable code. In some embodiments, each element of the controller 12 may be partially or completely network-based or cloud-based, and may or may not be located in a single physical location.

Exemplary embodiments of the processor may include, but are not limited to, a digital signal processor (DSP), a central processing unit (CPU), a field programmable gate array (FPGA), a microprocessor, a multi-core processor, and/or combinations thereof, for example. The one or more processors may be capable of communicating via a network (e.g., analog, digital, optical and/or the like in some embodiments. The one or more processors may include one or more input ports (e.g., physical or virtual ports) capable of receiving data (e.g., receiving data from one or more sensors, motors, and/or pressure sensors. Additionally, the one or more processors may include one or more output ports (e.g., physical or virtual ports) capable of transmitting data to one or more elements of the AHU. The one or more processors may be capable of reading and/or executing processor executable code and/or capable of creating, manipulating, retrieving, altering and/or storing data structure into one or more memories. In some embodiments, the one or more memories may be located in the same physical location as the one or more processors. Alternatively, the one or more memories may be implements as a cloud memory (i.e., one or more memories may be partially or completely based on or accessed using a network, for example). The one or more memories may store processor executable code and/or information comprising one or more database and program logic. For example, the database hosted by the one or more processors may store data indicative of temperature, humidity, pressure and/or the like.

In some embodiments, the controller 12 may include one or more input devices and one or more output devices. The one or more input devices may be capable of receiving information directly from a user, processor and/or environment and transmit such information to the one or more processors. The one or more input devices may include, but are not limited to, implementation as a keyboard, touchscreen, mouse, trackball, microphone, fingerprint reader, infrared port, cell phone, PDA, controller, network interface, speech recognition, gesture recognition, eye tracking, brain-computer interface, combination thereof, and/or the like.

The one or more output devices may be capable of outputting information in a form perceivable by a user and/or processor(s). In some embodiments, the one or more output devices may be configured to output information automatically (i.e., without human intervention). For example, in some embodiments, the one or more output devices may be capable of printing or displaying at a pre-determined time interval an accounting of sensor parameters, valve control, power parameters, and/or the like. The one or more output devices may include, but are not limited to, implementation as a computer monitor, a screen, a touchscreen, a speaker, a website, a television set, an augmented reality system, a smart phone, a PDA, a cell phone, a fax machine, a printer, a laptop computer, an optical head-mounted display, combinations thereof, and/or the like.

In some embodiments, the controller 12 may communicate with one or more user systems. The user system may be implemented as a smartphone, a tablet, a laptop computer, a personal computer, a desktop computer, a computer terminal, a computer workstation, a wireless network capable handheld device, a personal digital assistant, and/or the like. The user system may include one or more processors, one or more transitory processor readable medium, an input device, and an output device. The processor, the one or more non-transitory processor readable medium, the input device and the output device of the user system may be implemented similarly to the elements of the controller. The user system may be configured to interface with the controller 12 via a wired or wireless network.

The user system may store processor executable instructions or a software application. For example, the user system may include a web browser and/or native software application running on the user system and configured to communicate with the controller 12 over a network. The software application on the user system may be configured to access a website and/or communicate information and/or data with the controller over the network. In some embodiments, the user system may include an application program (e.g., specialized program downloaded onto the user system), and communicate with the controller 12 via the network through the application. In some embodiments, the user system may receive one or more notifications from the controller 12 (e.g., fan fault detection, cooling deficiency).

Returning now to the detailed description, various non-limiting embodiments of the inventive concepts will be described in further detail.

Configuration and Specifications of the Test Fan Speed Control System

Before the model development and control performance validation, the general configuration of the fan control system 10 at a single duct AHU 14 and the test AHU specifications are briefly introduced.

Figure 1:
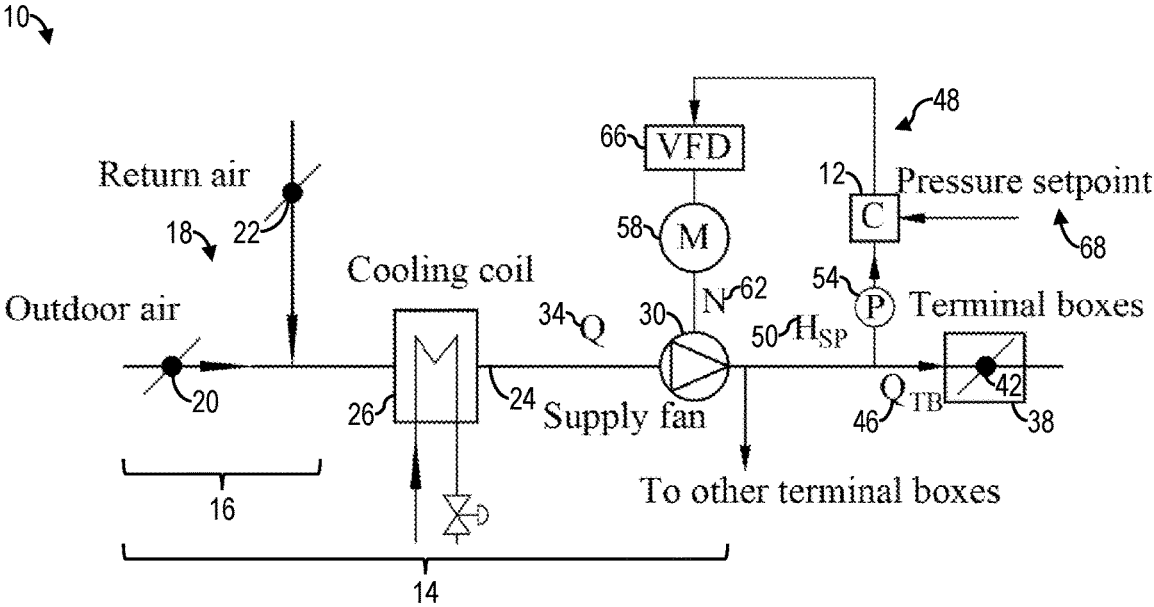
FIG. 1 is a schematic of fan speed control at an AHU.

FIG. 1 shows the schematic of a single duct AHU 14, which is made up of an outdoor air section 16 with interlinked dampers 18, including an outdoor air damper 20 and a return air damper 22, one or more duct 24, a cooling coil 26, and a supply air fan 30. The supply fan 30 delivers the supply air (Q) 34 cooled by the cooling coil 26 to TBs 38 to achieve space thermal comfort.

While the AHU 14 comprising the supply air fan 30 delivering the supply air (Q) 34 is described herein for illustrative purposes, persons having ordinary skill in the art will understand that the system 10 is also applicable to any fluid circulation system comprising any motive force generator for applying a motive force to fluids such as, for example, a liquid circulation system comprising a pump for delivering liquids (e.g., water) or an air circulation system comprising a fan for delivering air. When the system 10 is used for circulating liquids (e.g., water), the source of motive force is a pump, the damper (disturbance) becomes the control valve of cooling coil at AHUs and duct static pressure (controlled variable) described herein becomes water loop pressure differential. The following disclosure describes the AHU 14 in an air-based system having the air fan 30 delivering the supply air 34, etc. When interpreting the following description for a liquid-based system, the term "fan" will be understood to refer to a pump, and the term "duct" will be understood to refer to a pipe.

The damper 42 of the pressure-independent TBs 38 is adjusted to maintain the TB airflow rate $(Q_{TB})$ 46 at its setpoint, which is determined by the space air temperature control loop 48 associated with the space temperature setpoint and limited by the TB minimum and maximum airflow rate setpoints. Furthermore, the TB damper position will impact the duct static pressure $(H_{sp})$ 50 measured by a pressure differential sensor (P) 54, which is the duct static pressure 50 of the conditioned space. Therefore, the pressure loss on ducts 24 downstream from the pressure differential sensor 54 equals the value measured by the pressure differential sensor 54 plus the space static pressure. Ideally, the space positive static pressure recommended by ASHRAE is at least 1 Pa (0.004 inch of water) (ASHRAE 2007), which is small and can be ignored. In this case, the duct static pressure 50 reflects the pressure loss of the downstream ducts 24. Meanwhile, the supply fan 30 that is driven by a motor (M) 58 (e.g., an induction motor) creates the fan head to overcome the pressure losses through the air distribution system 10. The fan speed (N) 62 is modulated by a VFD 66 to maintain the duct static pressure 50 at its setpoint 68. The initial duct static pressure setpoint 68 was 249 Pa (1.0 inch of water). However, due to energy efficient lighting and office equipment upgrade in spaces, the space cooling load and associated supply airflow rate were significantly less than the initial design values. A new duct static pressure 50 was identified as 124 Pa (0.5 inch of water), which can ensure that all the TBs 38 can receive the required airflow at actual operation conditions in the afternoon during the hot summer.

To calibrate the developed model and validate the control performance improvement using the gain-scheduling control strategy, tests were conducted on a single duct AHU 14 that serves an education building in Norman, Oklahoma The duct static pressure differential sensor 54 is located two-thirds of the way downstream of the supply air duct 24 with four TBs 38 at its downstream and three TBs 38 at its upstream. The fan 30 is driven by a 3ph 208V 3HP motor 58, with a design fan airflow rate 34 of 1180 L/s (2,500 CFM) and a design fan head of 547 Pa (2.2 inch of water).

The fan speed 62 was initially controlled by a well-tuned fixed-gain PI controller 12a with a P gain of 0.44%/Pa (110%/inch of water) and an I gain of 0.044%/Pa-second (11%/inch of water-second) to achieve the desired control performance with 20% overshoot under the operation condition where the duct static pressure setpoint 68 is 124 Pa (0.5 inch of water) and the fan speed 62 is 55 Hz. The transfer function of the PI controller 12 with the fixed gains is expressed as:

$$C_{fix} = P + \frac{I}{s} \tag{1}$$

During the tests, the VFD frequency command (CO) 70 and fan speed 62 (VFD output frequency feedback) were directly obtained from the VFD 66. The fan airflow rate 34 was measured using an existing air flow meter. The duct static pressure 50 was measured using a duct static pressure differential sensor 54 with an accuracy of ±0.4% of full scale, which is 1244 Pa (5 inch of water). All the test data were recorded at 1 second intervals.

Control-Oriented Model of Fan Speed Control Systems

In this section, the theoretical fan speed control model is first developed to identify the nonlinearity of the fan system gain. Then, the model is calibrated through three open-loop tests.

Theoretical Model Development

Figure 2:
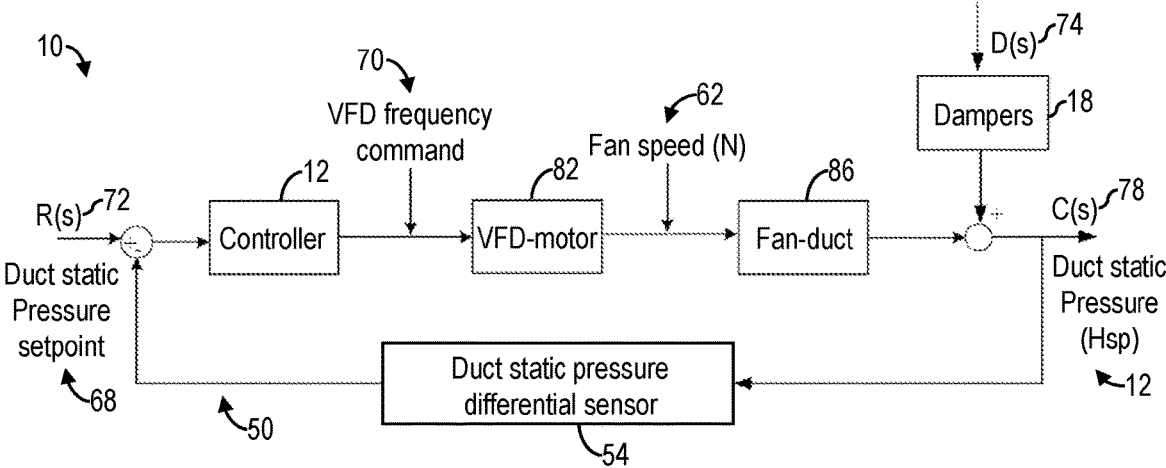
FIG. 2 is a block diagram of traditional single-loop fan speed control.

The block diagram of the fan speed control system 10 defined in FIG. 1 with the reference input 72 and the disturbance input 74 is shown as FIG. 2. The controlled variable (C) 78 is the supply air duct static pressure 50; the reference input (R) 72 is the setpoint 68 of the duct static pressure 50; the disturbance input (D) 74 is the TB 38 airflow setpoint change, which will lead to the TB damper 42 position change and consequently disturb the duct static pressure 50. There are three components of the fan speed control system 10 model, in addition to the controller 12: the VFD-motor 82, the fan-duct 86, and the duct static pressure differential sensor 54.

Fan-Duct 86 Model

The transfer function of the fan-duct component 86 can be modeled as a first-order system at each operation condition.

$$G_{fd} = \frac{K_{fd}}{\tau_{fd}s + 1} \tag{2}$$

where $K_{fd}$ is the fan-duct 86 gain, defined as the ratio of the duct static pressure 50 change to the fan speed 62 change, and $\tau_{fd}$ is the fan-duct 86 time constant at each operation condition.

Theoretically, the fan-duct 86 transfer function is derived from its dynamic physical model by linearizing the nonlinear differential equation using the Taylor series expansion (Nise 2019). Considering the complexity, the nonlinear dynamic fan system can be analyzed by a Hammerstein model, which consists of a model of a nonlinear static system and a model of a linear dynamic system (Lennart 1999). To develop the fan-duct 86 model, the nonlinear steady-state (static) model can be developed first, and the dynamics can be introduced by adding in the time constant at each operation condition, which follows the same procedure in previous studies (Mei and Levermore 2002, Raisoni, Raman et al. 2018).

Since the pressure loss of the ducts 24 (DP) downstream from the pressure differential sensor 54 is proportional to the supply airflow rate squared (Shim, Song et al. 2014), the duct static pressure ($H_{sp}$) 50 plus the space static pressure ($H_{space}$) is determined by the airflow rate through the downstream TBs 38 and the resistance coefficient of the downstream ducts 24 and TBs 38.

$$DP = H_{sp} + H_{space} = S_{TB}(Q_{TB})^2 = S_{TB}(\alpha Q)^2 \tag{3}$$

where a is the ratio of the airflow rate 46 through the TBs 38 ($Q_{TB}$) downstream from the duct static pressure differential sensor 54 to the fan airflow rate (Q) 34; $S_{TB}$ is the lumped resistance coefficient of the downstream ducts 24 and TBs 38 of the duct static pressure differential sensor 54, which is determined by the TB damper positions. The TB damper positions can be considered static within a very short time period when the fan speed experiences a small excursion. In this case, the lumped resistance coefficient ($S_{TB}$) can be considered constant.

According to the affinity laws, with fixed damper positions (i.e., the same resistance coefficient), the fan airflow rate (Q) 34 is proportional to the fan speed (N) 62.

$$Q = \beta N \tag{4}$$

where $\beta$ is the constant ratio of the fan airflow rate 34 to the fan speed 62 at fixed TB damper positions. By combining Eq. (3) and Eq. (4), the nonlinear relationship between the pressure loss on ducts 24 downstream from the pressure differential sensor 54, which equals the duct static pressure ($H_{sp}$) 50 plus the space static pressure ($H_{space}$), and the fan speed (N) 62, is obtained as Eq. (5).

$$DP = H_{sp}H_{space} = S_{TB}(\alpha\beta)^2N^2 \tag{5}$$

Therefore, by conducting the Taylor series expansion, the duct pressure loss change, which is also the duct static pressure change if the space static pressure remains constant, can be expressed by Eq. (6):

$$\Delta H_{sp} = \tag{6}$$

$$\Delta DP = \frac{\partial H_{sp}}{\partial N}\Delta N + \frac{\partial^2 H_{sp}}{\partial N^2}\frac{(\Delta N)^2}{2} = 2S_{TB}(\alpha\beta)^2N \cdot \Delta N + S_{TB}(\alpha\beta)^2(\Delta N)^2$$

Thus, the fan-duct gain ($K_{fd}$), the ratio of the duct static pressure change to the fan speed change, can be calculated with the duct static pressure ($H_{sp}$) 50 and the fan speed (N) 62 at each steady-state (i.e., stable) operation condition, shown as Eq. (7).

$$K_{fd} = \frac{\Delta H_{sp}}{\Delta N} = 2\frac{(H_{sp} + H_{space})}{N} + \frac{\Delta N}{N^2}(H_{sp} + H_{space}) \quad (7)$$

For small space static pressure ($H_{space} \approx 0$) and small excursion of the fan speed 62 ($\Delta N \approx 0$), the fan-duct gain is ideally proportional to the ratio of the duct static pressure ($H_{sp}$) 50 to the fan speed (N) 62 at each operation condition, which indicates the nonlinearity of the fan-duct component 86 as well as the fan speed control system 10.

$$K_{fd} = 2\frac{H_{sp}}{N} \quad (8)$$

Then, for the dynamic model, the dynamics can be introduced to the steady-state fan-duct gain in Eq. (8) with the fan-duct time constant ($\tau_{fd}$) calibrated through step change response tests.

VFD-Motor Model

Because of the ramping feature of VFDs 66 (Hao, Lin et al. 2014) and the linear relationship between the VFD frequency command (CO) 70 and fan speed 62 (Joo, Liu et al. 2007), the transfer function of the VFD-motor component 82 ($G_{Vm}$) can be modeled as a first-order system.

$$G_{Vm} = \frac{K_{Vm}}{\tau_{Vm}s + 1} \quad (9)$$

where $K_{Vm}$ is the VFD-motor gain, defined as the ratio of the fan speed 62 change to the VFD frequency command (CO) 70 change, and $\tau_{Vm}$ is the VFD-motor time constant.

Duct Static Pressure Differential Sensor

In practice, the duct static pressure differential sensor 54 can also be modeled as a first-order system. The sensor 54 gain is one if the duct static pressure setpoint 68 has the same unit as the measured duct static pressure 50. The time constant's value is constant and available from the sensor 54 manufacturer.

$$G_s = \frac{1}{\tau_s s + 1} \quad (10)$$

Therefore, the system 10 model ($G_{sys}$) at a particular operation condition, including the fan-duct 86 model ($G_{fd}$), VFD-motor model ($G_{Vm}$), and duct static pressure differential sensor 54 ($G_s$) can be expressed as Eq. (11).

$$G_{sys} = \frac{K_{sys}}{(\tau_{Vm}s + 1)(\tau_{fd}s + 1)(\tau_s s + 1)} = \frac{K_{Vm} \cdot 2\frac{H_{sp}}{N}}{(\tau_{Vm}s + 1)(\tau_{fd}s + 1)(\tau_s s + 1)} \quad (11)$$

where $K_{sys}$ refers to the system 10 gain, i.e., the product of the VFD-motor 82 gain and the fan-duct 86 gain.

Model Calibration Through Open-Loop Tests

To calibrate the system 10 model, an open-loop test was conducted by fixing the TB damper 42 at different positions and incrementally changing the fan speed 62 from 29 Hz to 38 Hz, 47 Hz, 56 Hz and 58 Hz with a step change of the VFD frequency command (CO) 70. Since the control system 10 uses two digital signals, either an opening or closing command, to control the TBs 38 without the damper 42 position information, the TB damper 42 position can only be accurately controlled to be fully open or closed. To fully open one TB 38, the minimum airflow setpoint was set to be higher than its capacity. To fully close one TB 38, on the other hand, the maximum airflow setpoint was set to be zero. During the tests, the number of fully closed TBs 38 was controlled to generate different operation conditions. For example, increasing the number of fully closed TBs 38 is equivalent to reducing the wide-open position of the TB dampers 42. All the TBs 38 were fully open in the first test, and two TBs 38 at the downstream and one TB 38 at the upstream were fully closed in the second test. Finally, three TBs 38 at the downstream and two TBs 38 at the upstream were fully closed in the third test.

The duct static pressure differential sensor 54 had a time constant ($\tau_s$) of 0.25 seconds according to the manufacturer, while its gain was 1 Pa/Pa (1.0 inch of water/inch of water). The first-order transfer functions of the VFD-motor 82 and fan-duct 86 are obtained from the open-loop step response tests by measuring the steady-state value and the time constant, which is the time for the amplitude to reach 63% of its final value, at each operation condition (Nise 2019). The transfer function of the VFD-motor component 82 ($G_{Vm}$) was identified with the gain (Kym) equal to 0.6 Hz/% and the time constant ($\tau_{Vm}$) equal to 3 seconds regardless of operation conditions. In addition, the fan-duct 86 time constant ($\tau_{fd}$) was approximated as 0.5 seconds, which was also independent of the operation condition. On the other hand, the fan-duct 86 gain was measured to be varied under various operation conditions. Table 1 shows the fan-duct 86 gain ($K_{fd}$) and the ratio of the duct static pressure ($H_{sp}$) 50 to the fan speed (N) 62 under various operation conditions of the three open-loop tests.

Figure 3:
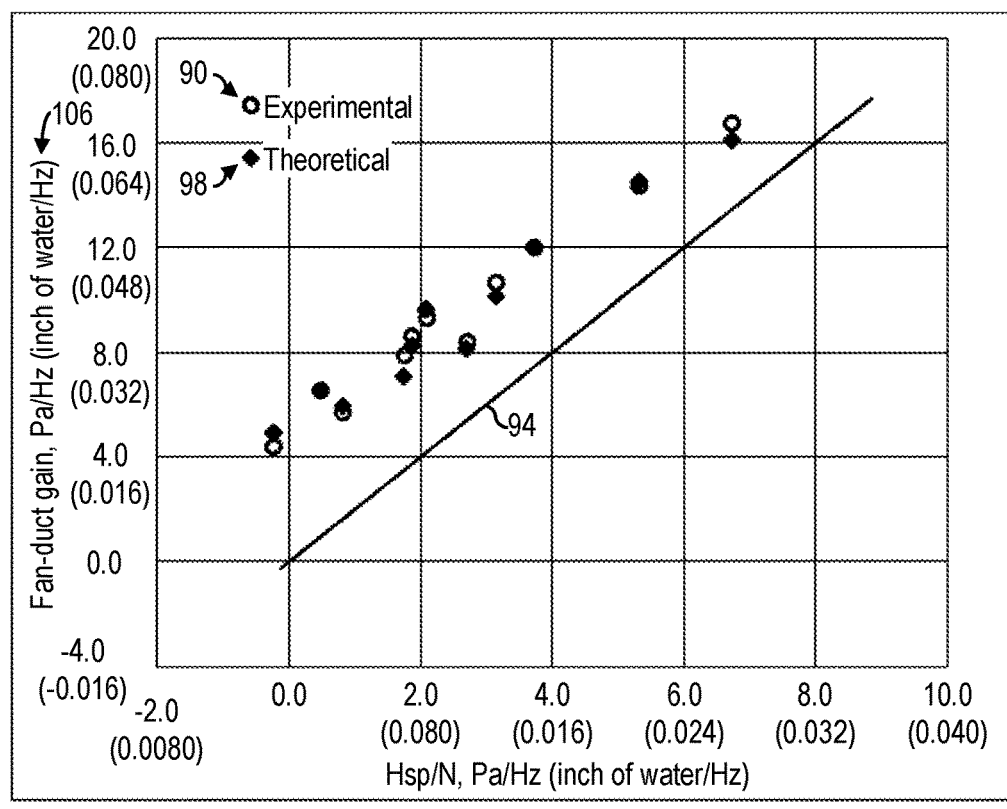
FIG. 3 is a graph showing $$\frac{H_{sp}}{N}$$

FIG. 3 compares the experimental and ideal theoretical fan-duct gain versus the ratio of the duct static pressure 50 to the fan speed 62. The circle marker represents the experimental fan-duct gain 90 measured through the tests while the line represents the ideal theoretical relationship 94 between the fan-duct 86 gain and the ratio of the duct static pressure 50 to the fan speed 62 based on Eq. (8).

It reveals that the experimental fan-duct gain 90 is larger than the ideal theoretical fan-duct gain 98. As previously stated, the ideal theoretical fan-duct gain 98 is derived based on three assumptions, (1) the fan airflow rate 34 conforms the affinity laws, defined by Eq. (4); (2) the duct static pressure 50 conforms the affinity laws with the small space static pressure ($H_{space} \approx 0$), defined by Eq. (5); (3) the fan speed excursion is small ($\Delta N \approx 0$).

As for the first assumption, FIG. 4 presents the fan airflow rate 34 versus the fan speed 62 with the TBs 38 fully open as an example, which proves that the fan airflow rate 34 is proportional to the fan speed 62 and the affinity laws can be applied as in Eq. (4).

As for the second assumption, Table 1 shows a negative duct static pressure 50 when the fan speed 62 is 29 Hz with all the TBs 38 fully open, which indicates that the space positive static pressure may be considerably too large to be neglected. Furthermore, FIG. 5 shows the duct static pressure 50 versus the fan speed (cross marker) 62 measured by the pressure differential sensor 54. The measured correlation does not conform to the affinity laws defined by Eq. (5) and the space static pressure was not small. Then the space static pressure was identified to be 62 Pa (0.25 inch of water) to ensure that the duct pressure loss 102, the sum of the duct static pressure 50 and the space static pressure, is proportional to the fan speed 62 squared, which is represented by triangle markers in FIG. 5.

As for the third assumption, the fan speed 62 excursion reaches around 9 Hz, which is not small enough, and the third assumption also needs to be reconsidered. Therefore, by considering the considerable space static pressure and fan speed 62 change, the theoretical fan-duct gain 98 is recalculated using Eq. (7) and shown in FIG. 3 with the diamond marker, which matches well with the experimental fan-duct gain 90. This means that the experimental fan-duct gain 90 can match with the theoretical value 98 and the fan-duct 86 gain model defined by Eq. (7) is validated.

To conclude, the time constants of all the components and the gains of all components except the fan-duct component 86 can be considered constant. Under a normal (i.e., stable) operation where the space static pressure and fan speed 62 change are small, the fan-duct gain ($K_{fd}$) 90 is proportional to the ratio of the duct static pressure 50 to the fan speed 62, which is supposed to be the main factor that causes the nonlinearities of the fan speed control system 10.

Control Performance Validation with a Fixed-Gain Controller 12a

According to the developed fan speed control model, with a fixed-gain controller 12a, the system 10 will have a larger system gain and consequently more aggressive response under the operation conditions with lower fan speed 62 or higher duct static pressure 50, i.e., a larger ratio of the duct static pressure 50 to the fan speed 62.

Tests with Variable Fan Speed and Constant Duct Static Pressure

To validate the control performance impacted by the variable fan speed 62, the TB damper position was overridden with different numbers of fully closed TBs 38 to create various partial load conditions, while the duct static pressure setpoint 68 was fixed at 124 Pa (0.5 inch of water). At each operation condition, the system 10 was maintained for more than 17 minutes. In Test condition 1, two TBs 38 were set to be fully closed. Then the two fully closed TBs 38 were set to be fully open in Test condition 2. Afterward, one TB 38 plus two TBs 38 closed in Test condition 1 were set to be fully closed in Test condition 3. Meanwhile, the remaining TBs 38 maintained their original airflow setpoints.

FIG. 6 presents the system response of the fan speed (upper line) 62 and duct static pressure (lower line) 50. The fan speed 62 varies from 39 Hz to 43 Hz and 37 Hz while the duct static pressure 50 oscillates around its setpoint of 124 Pa (0.5 inch of water). FIG. 7 presents the fan airflow rate (upper line) 34 and the ratio 106 of the duct static pressure 50 to the fan speed 62 (lower line) with variable fan speed. The corresponding fan airflow rate 34 varies from 475 L/s (1,007 CFM) to 566 L/s (1,199 CFM) and 400 L/s (848 CFM).

Tests with Variable Fan Speed and Variable Duct Static Pressure

To validate the control performance impacted by the variable duct static pressure 50 in addition to the fan speed 62, the duct static pressure setpoint 68 was incrementally changed from 100 Pa (0.4 inch of water) in Test condition 4 to 149 Pa (0.6 inch of water) in Test condition 5, 199 Pa (0.8 inch of water) in Test condition 6 and 249 Pa (1.0 inch of water) in Test condition 7 while the TB airflow setpoint was fixed by setting all the TBs' maximum and minimum settings as fixed values. Similarly, at each operation condition, the system was maintained for more than 17 minutes.

As discussed previously, the optimal duct static pressure 50 is 124 Pa (0.5 inch of water) for the actual operation conditions and the goal of using the duct static pressure setpoints 68 higher than the optimal setpoint is to validate the control performance impacted by the variable duct static pressure 50 and the improvement by using the gain-scheduling controller 12b.

FIG. 8 presents the system response of the fan speed (upper line) 62 and duct static pressure (lower line) 50, while FIG. 9 presents the fan airflow rate (upper line) 34 and the ratio 106 of the duct static pressure 50 to fan speed 62 (lower line) with duct static pressure 50 change. It can be observed that the fan airflow rate 34 remains almost constant.

Table 2 lists the fan airflow rate 34, duct static pressure 50, fan speed 62 and the corresponding ratio 106 of the duct static pressure 50 to the fan speed 62 under the seven test conditions.

Control Performance Summary with a Fixed-Gain Controller 12a

Specifically, to comprehensively evaluate the performance of the fan speed control system 10, the quantitative specifications, such as the rise time, settling time and overshoot, are expected to be computed. However, the system 10 response is too fast to accurately catch the dynamic response specifications using the recorded data with a sampling time of 1 second.

Therefore, the control performance impacted by the noise and system oscillation at the steady-state conditions was evaluated by using three indices, including the oscillation range of the fan speed 62 and duct static pressure 50, and the root mean squared error (RMSE) of the duct static pressure 50.

The oscillation range was defined as the difference between the average maximum value and the average minimum value of the fan speed 62 or duct static pressure 50 at each operation condition; the RMSE of the duct static pressure 50 was calculated using Eq. (12). Since the fan speed 62 varies as the operation condition is changed, the RMSE of the fan speed 62 was not evaluated.

$$RMSE = \sqrt{\frac{\sum_{j=1}^{n}(H_{spj,measured} - H_{spj,setpoint})^2}{n}} \quad (12)$$

where $H_{spj,measured}$ and $H_{spj,setpoint}$ refer to the measured value and the setpoint of the duct static pressure 50 at the jth sample respectively; n is the total number of the measured samples. Table 3 lists the oscillation range of the fan speed 62 and duct static pressure 50 as well as the RMSE of the duct static pressure 50 under the seven test conditions.

By comparing the performance among Test conditions 1-3, it can be observed that, with fixed duct static pressure 50, the system 10 response becomes more aggressive under lower fan speed 62 and lower airflow rate 34 with larger values of the three indices. Similarly, by comparing the performance among Test conditions 4-7, the system 10 has more aggressive response with larger values of the three indices under higher duct static pressure 50. On the other hand, the duct static pressure 50 reset, which reduces the duct static pressure setpoint 68 to achieve lower fan speed 62 at partial load conditions, will have a sluggish response. Meanwhile, the TBs 38 with airflow control tend to maintain the same fan airflow after the transient period while the control performance is significantly different, indicating that the fan airflow rate 34 is not a factor that impacts the system 10 performance.

Specifically, with the fixed-gain controller 12a, the system 10 has the worst control performance under Test condition 7 with fan speed 62 at 50 Hz and duct static pressure 50 at 249 Pa (1.0 inch of water), where the ratio 106 of the duct static pressure 50 to fan speed 62 also has the largest value of 5.0 Pa/Hz (0.02 inch of water/Hz). In this case, the oscillation range of the fan speed 62 reaches up to 4.7 Hz, while the oscillation range of the duct static pressure 50 reaches up to 69 Pa (0.28 inch of water). The RMSE of the duct static pressure 50 reaches up to 24 Pa (0.098 inch of water). Compared to the performance at Test condition 2 where the ratio 106 of the duct static pressure 50 to the fan speed 62 is 3.2 Pa/Hz (0.013 inch of water/Hz), the oscillation ranges of the fan speed 62 and duct static pressure 50 as well as the RMSE of the duct static pressure 50 are approximately tripled.

To conclude, the test results with a fixed-gain controller 12a match the control performance indicated by the developed fan speed 62 control model. Furthermore, the fan airflow rate 34 alone is not sufficient enough to indicate the system 10 nonlinearities, while the ratio 106 of the duct static pressure setpoint 68 to fan speed 62 is supposed to be the better indicator.

Performance Improvement Through Gain-Scheduling Control

In this section, the gain-scheduling controller 12b is first designed. Then, the control performance improvement by implementing the designed gain-scheduling controller 12b is validated through experiments at the test conditions identical to those using the fixed-gain controller, listed in Table 2.

Gain-Scheduling Controller 12b Design

Based on the developed fan speed 62 control model and the validated control performance with a fixed-gain controller 12a, the main nonlinearities of the fan speed control systems 10 are caused by the variation of the fan-duct 86 gain ($K_{fd}$), which consequently results in the variable system 10 gain ($K_{sys}$), under variable operation conditions. Therefore, to compensate for its nonlinearities and achieve identical control performance under variable operation conditions, the main idea is to cancel out the variation of the system 10 gain ($K_{sys}$). Specifically, its control performance can be impacted by the variable fan speed 62 and duct static pressure 50 while the ratio 106 of the duct static pressure 50 to the fan speed 62 is more sufficient to indicate the nonlinearities under normal (i.e., stable) operation condition where the space static pressure and the fan speed 62 change are not considerable.

Even though the space static pressure was considerably large during the model calibration tests, it is not controlled by the test AHU 14 and is supposed to be approximately zero under the common normal (i.e., stable) operation conditions. Thus, it is still rational to apply Eq. (11) to define the system 10 model ($G_{sys}$). As a result, the gain-scheduling controller 12b can be designed to compensate for the gain variation by adding a scheduling function to the existing fixed-gain controller 12a and convert it to a new controller 12, which can update its parameters according to the measurable duct static pressure 50 and fan speed 62. The block diagram of the gain-scheduling fan speed controller 12b is shown as FIG. 10. The scheduling function is designed as Eq. (13).

$$g(H_{sp}, N) = \frac{H_{sp},r}{H_{sp}} \cdot \frac{N}{N_r} \tag{13}$$

where $H_{sp}$,r and $N_r$ are the duct static pressure 50 and fan speed 62 under a reference condition, where the fixed-gain controller 12a results in a desired control performance of the AHU 14 fan. For the test system, the reference fan speed 62 is 55 Hz and the reference duct static pressure 50 is 124 Pa (0.5 inch of water). Consequently, the equivalent system 10 gain of the transformed system 10 would be fixed at the design condition and the system 10 is expected to have identical control behaviors under variable operation conditions.

As shown in FIG. 10, the fixed-gain controller 12a of the controller 12 may be operable to receive as an input a control signal 108 indicative of a difference between the reference input 72 (R(s)) (i.e., the duct static pressure setpoint 68) and the measured duct static pressure ($H_{sp}$) 50. The fixed-gain controller 12a may comprise circuitry operable to generate a VFD frequency command (CO) 70 (i.e., a control signal indicative of a motive force frequency) based at least in part on the first control signal 108 and to provide the VFD frequency command (CO) 70 as an output. The gain-scheduling controller 12b may be operable to receive as inputs the VFD frequency command (CO) 70, the measured duct static pressure ($H_{sp}$) 50, and the fan speed (N) 62. Further, the gain-scheduling controller 12b may comprise circuitry operable to generate an adjusted VFD frequency command (CO*) 110 (i.e., a control signal indicative of an adjusted motive force frequency) and to provide the adjusted VFD frequency command (CO*) 110 as an output. The adjusted VFD frequency command can be calculated as the VFD frequency command (CO) 70 multiplied by a gain value calculated with the scheduling function depicted above as Equation 13. The VFD-motor 82 may receive as an input the adjusted VFD frequency command (CO*) 110. In some implementations, the duct static pressure setpoint 68 may be used instead of the measured duct static pressure ($H_{sp}$) 50.

Gain-Scheduling Control Implementation and Control Performance Evaluation

To validate the control performance improvement of the gain-scheduling control strategy, the closed-loop tests were conducted under the seven same test conditions on the same test AHU 14 using the gain-scheduling controller 12b designed above. For implementation, the duct static pressure setpoint 68 rather than the measured value was applied to update the controller 12b to avoid the measurement noise caused by the duct static pressure 50 differential sensor.

FIGS. 11A and 11B compare the system 10 response of the fan speed 62 (shown in FIG. 11A) and the duct static pressure 50 (shown in FIG. 11B) with variable fan speed 62 and constant duct static pressure setpoint 68 under Test conditions 1 to 3 using the fixed-gain controller 12a and gain-scheduling controller 12b, while FIGS. 12A and 12B compares the system response of the fan speed 62 (shown in FIG. 12A) and duct static pressure 50 (shown in FIG. 12B) with variable fan speed 62 and variable duct static pressure setpoint 68 under Test conditions 4 to 7 using the fixed-gain controller 12a and gain-scheduling controller 12b. The lighter line and the darker line represent the fan speed 62 using the fixed-gain controller 12a and gain-scheduling controller 12b, respectively. The lighter line and the darker line represent the duct static pressure 50 using the fixed-gain controller 12a and gain-scheduling controller 12b, respectively. According to Eq. (13), the gain-scheduling function is reversely proportional to the ratio of the duct static pressure 50 to the fan speed 62, which is presented in FIG. 7 and FIG. 9 under all seven test conditions.

Overall, it can be observed that the system 10 response with the gain-scheduling controller 12b has much better control performance than that with the fixed-gain controller 12a. As the ratio of the duct static pressure 50 to the fan speed 62, i.e., the fan-duct 86 gain, increases in Test condition 3 presented in FIG. 7, and increases from Test conditions 4 to 7 presented in FIG. 9, the oscillation range of the fixed-gain controller 12a increases as the fan-duct 86 gain increases. On the other hand, as the gain-scheduling function is reversely proportional to the fan-duct 86 gain, the gain-scheduling controller 12b can effectively compensate of the fan-duct 86 gain variation and can approximately maintain the identical control behaviors under all various operation conditions.

The oscillation range of the fan speed 62 and duct static pressure 50 as well as the RMSE of the duct static pressure 50 with the gain-scheduling controller 12b are also calculated and listed in Table 3. Compared to the control performance with the fixed-gain controller 12a, under the same operation condition at the Test condition 7 with the gain-scheduling controller 12b, the oscillation range of the fan speed 62 is 0.9 Hz, which is reduced by 81%, while the oscillation range of the duct static pressure 50 is 25 Pa (0.10 inch of water), which is reduced by 74%. The RMSE of the duct static pressure 50 is 11 Pa (0.043 inch of water), which is 44% of that with the fixed-gain controller 12a.

Specifically, it can be observed that the system 10 with the gain-scheduling controller 12b does not exactly stay the same as the control performance independent of the operation conditions. Ideally, the fan-duct 86 gain is two times that of the ratio of the duct static pressure 50 to the fan speed 62, based on which the gain-scheduling controller 12b is designed. However, the tested space is a small part of a large building which is served by several large AHUs 14 without a return fan 30 and relief duct 24, and these AHUs 14 were under economizer operation during the tests. Thus, the space static pressure was much larger than the recommended value. Consequently, the equivalent system gain varies slightly under various operation conditions. However, in practice, the space static pressure is expected to be small and the gain-scheduling control strategy can achieve a critical improvement in the nonlinear control performance of the fan speed control system 10, which is simple and costless to implement.

CONCLUSIONS

A control-oriented model of the fan speed control system 10 at AHUs 14 has been developed and calibrated. The model reveals a nonlinear feature of the fan speed control system 10 under normal (i.e., stable) operation where the fan duct 86 gain is proportional to the ratio 106 of the duct static pressure 50 to the fan speed 62, which is more effective in identifying the system 10 nonlinearities rather than the fan airflow rate 34.

The nonlinear feature makes the system 10 have more aggressive control performance under the operation conditions, such as the reduced airflow rate 34 under the fixed duct static pressure 50 and the increased duct static pressure 50 with the same airflow rate 34, where the ratio 106 of the duct static pressure 50 to the fan speed 62 is larger. Specifically, the system 10 with the fixed-gain controller 12a under the worst operation condition, with fan speed 62 at 50 Hz and duct static pressure 50 at 249 Pa (1.0 inch of water), had an oscillation range of the fan speed 62 and duct static pressure 50 of 4.7 Hz and 69 Pa (0.28 inch of water), respectively. The RMSE of the duct static pressure 50 was 24 Pa (0.098 inch of water).

The designed gain-scheduling controller 12b can effectively compensate for the system gain variation and approximately maintain the identical control behaviors under variable operation conditions. By applying the gain-scheduling controller 12b, the oscillation range under the same operation condition can be reduced by up to 74% for the duct static pressure 50 and by up to 81% for the fan speed 62. In addition, the RMSE of the duct static pressure 50 can also be reduced by 24 Pa (0.043 inch of water).

In at least certain embodiments, the control-oriented model of the present disclosure can represent the fan speed control system 10 nonlinear characteristic while being simple enough without requiring detailed information on the system 10 parameters, which can be used for more effective design of duct static pressure setpoint 68 reset control and VAV system controls. Since the derivation of the fan-duct 86 model is based on the affinity laws, the control-oriented model can also be extended to the pump-pipe systems for better pump speed control system design. The gain-scheduling control strategy can achieve almost identical fan speed 62 control behaviors under all operation conditions. For implementation, the gain-scheduling control strategy selected the readily available duct static pressure 50 and fan speed 62 as the scheduling variables, which is costless without additional measurements and simple enough without requiring multiple controller tuning processes for particular use in industrial applications.

TABLE 1

Fan–duct gain and $\frac{H_{sp}}{N}$ under various operation conditions.

| Test | Fan airflow rate L/s (CFM) | Duct static pressure Pa (inch of water) | Fan speed (Hz) | $\frac{H_{sp}}{N}$ Pa/Hz (inch of water/Hz) | Theoretical fan-duct gain Pa/Hz (inch of water/Hz) | Experimental fan-duct gain Pa/Hz (inch of water/Hz) |
|---|---|---|---|---|---|---|
| All | 474 | −7.5 | 29 | −0.25 | −0.50 5 | 4.4 |
| TBs | (1,004) | (−0.03) | | (−0.0010) | (−0.0020) | (0.018) |
| open | 633 | 32 | 38 | 0.82 | 1.6 | 5.7 |
| | (1,341) | (0.13) | | (0.0033) | (0.0066) | (0.023) |
| | 787 | 85 | 47 | 1.7 | 3.5 | 7.9 |
| | (1,667) | (0.34) | | (0.0070) | (0.014) | (0.032) |
| | 906 | 152 | 56 | 2.7 | 5.4 | 8.5 |
| | (1,919) | (0.61) | | (0.011) | (0.022) | (0.034) |
| Three | 416 | 17 | 29 | 0.47 | 0.95 | 6.6 |
| TBs | (881) | (0.07) | | (0.0019) | (0.0038) | (0.026) |
| closed | 550 | 75 | 38 | 1.9 | 3.7 | 8.6 |
| | (1,165) | (0.30) | | (0.0075) | (0.015) | (0.035) |
| | 666 | 152 | 47 | 3.2 | 6.3 | 11 |
| | (1,412) | (0.61) | | (0.013) | (0.025) | (0.043) |
| Five | 293 | 70 | 29 | 2.1 | 4.2 | 9.3 |
| TBs | (621) | (0.28) | | (0.0084) | (0.017) | (0.038) |
| closed | 372 | 147 | 38 | 3.7 | 7.5 | 12 |
| | (788) | (0.59) | | (0.015) | (0.030) | (0.048) |
| | 442 | 259 | 47 | 5.3 | 11 | 14 |
| | (936) | (1.04) | | (0.021) | (0.0428) | (0.058) |
| | 480 | 376 | 56 | 6.7 | 13 | 17 |
| | (1,018) | (1.51) | | (0.027) | (0.054) | (0.068) |

TABLE 2

Test conditions.

| Test condition | Fan airflow rate L/s (CFM) | Duct static pressure Pa (inch of water) | Fan speed (Hz) | $\frac{H_{sp}}{N}$ Pa/Hz (inch of water/Hz) |
|---|---|---|---|---|
| Cond. 1 | 475 (1,007) | 124 (0.5) | 39 | 3.2 (0.013) |
| Cond. 2 | 566 (1,199) | 124 (0.5) | 43 | 3.0 (0.012) |
| Cond. 3 | 400 (848) | 124 (0.5) | 37 | 3.5 (0.014) |
| Cond. 4 | 385 (817) | 100 (0.4) | 39 | 2.5 (0.010) |
| Cond. 5 | 364 (772) | 149 (0.6) | 43 | 3.5 (0.014) |

TABLE 2-continued

Test conditions.

| Test condition | Fan airflow rate L/s (CFM) | Duct static pressure Pa (inch of water) | Fan speed (Hz) | $\frac{H_{sp}}{N}$ Pa/Hz (inch of water/Hz) |
|---|---|---|---|---|
| Cond. 6 | 364 (771) | 199 (0.8) | 46 | 4.2 (0.017) |
| Cond. 7 | 368 (779) | 249 (1.0) | 50 | 5.0 (0.020) |

TABLE 3

Oscillation range and RMSE under the seven test conditions.

| Test condition | Fan speed oscillation range (Hz) | | Duct static pressure oscillation range Pa (inch of water) | | RMSE of duct static pressure Pa (inch of water) | |
|---|---|---|---|---|---|---|
| | Fixed | Gainsched | Fixed | Gainsched | Fixed | Gainsched |
| Cond. 1 | 1.8 | 0.9 | 22 (0.088) | 14 (0.055) | 8.7 (0.035) | 5.7 (0.023) |
| Cond. 2 | 1.6 | 1.0 | 19 (0.075) | 15 (0.059) | 7.7 (0.031) | 6.0 (0.024) |
| Cond. 3 | 2.8 | 0.8 | 32 (0.13) | 12 (0.050) | 12 (0.048) | 5.7 (0.023) |
| Cond. 4 | 1.8 | 1.4 | 20 (0.081) | 19 (0.076) | 8.5 (0.034) | 7.7 (0.031) |
| Cond. 5 | 3.4 | 1.2 | 42 (0.17) | 20 (0.079) | 15 (0.062) | 8.2 (0.033) |
| Cond. 6 | 4.1 | 1.0 | 52 (0.21) | 22 (0.084) | 20 (0.081) | 9.7 (0.039) |
| Cond. 7 | 4.7 | 0.9 | 69 (0.28) | 25 (0.10) | 24 (0.098) | 10 (0.043) |

CITED REFERENCES

Afram, A. and F. Janabi-Sharifi (2014). "Theory and applications of HVAC control systems—A review of model predictive control (MPC)." Building and Environment 72: 343-355.

ASHRAE (2007). 2007 ASHRAE Handbook—HVAC Applications, Chapter 46, American Society of Heating, Refrigerating and Air-Conditioning Engineers . . .

ASHRAE (2010). ANSI/ASHRAE/IESNA Standard 90.1-2010: Energy Standard for Buildings Except Low-Rise Residential Buildings. American Society of Heating, Refrigerating and Air-conditioning Engineers, Inc. ISSN 1041-2336.

Barbosa, G. C., R. Bertolin, P. J. Gonzalez, A. B. Guimaraes Neto and F. J. Silvestre (2018). Fuzzy gain-scheduling applied for a very flexible aircraft. 2018 AIAA Guidance, Navigation, and Control Conference.

Chintala, R., C. Price, S. Liang and B. P. Rasmussen (2015). "Identification and Elimination of Hunting Behavior in HVAC Systems." ASHRAE Transactions 121(2).

DOE, U. S. (2011). Buildings Energy Data Book, Energy Efficiency and Renewable Energy Department, Washington DC Eltayeb, A., M. F. Rahmat, M. M. Eltoum and M. A. M. Basri (2019). Adaptive fuzzy gain scheduling sliding mode control for quadrotor UAV systems. 2019 8th International Conference on Modeling Simulation and Applied Optimization (ICMSAO), IEEE.

Esrafilian-Najafabadi, M. and F. Haghighat (2021). "Occupancy-based HVAC control systems in buildings: A state-of-the-art review." Building and Environment: 107810.

Gallego, A. J., G. M. Merello, M. Berenguel and E. F. Camacho (2019). "Gain-scheduling model predictive control of a Fresnel collector field." Control Engineering Practice 82: 1-13.

Ghefiri, K., I. Garrido, A. J. Garrido, S. Bouallègue and J. Haggège (2018). Fuzzy gain scheduling of a rotational speed control for a tidal stream generator. 2018 International Symposium on Power Electronics, Electrical Drives, Automation and Motion (SPEEDAM), IEEE.

Hao, H., Y. Lin, A. S. Kowli, P. Barooah and S. Meyn (2014). "Ancillary service to the grid through control of fans in commercial building HVAC systems." IEEE Transactions on smart grid 5(4): 2066-2074.

Joo, I.-S., M. Liu and G. Liu (2007). "Application of fan airflow stations in air-handling units." Energy engineering 104(2): 66-80.

Lennart, L. (1999). "System identification: theory for the user." PTR Prentice Hall, Upper Saddle River, NJ 28.

Mei, L. and G. Levermore (2000). "Stability analysis for a VAV test rig." Building Services Engineering Research and Technology 21(4): 225-232.

Mei, L. and G. Levermore (2002). "Simulation and validation of a VAV system with an ANN fan model and a non-linear VAV box model." Building and Environment 37(3): 277-284.

Moradi, H., M. Saffar-Avval and F. Bakhtiari-Nejad (2011). "Nonlinear multivariable control and performance analysis of an air-handling unit." Energy and Buildings 43(4): 805-813.

Naus, G. (2009). "Gain scheduling robust design and automated tuning of automotive controllers." TU Eindhoven.

Nise, N. S. (2019). Control Systems Engineering, 8th Edition, Wiley.

Okochi, G. S. and Y. Yao (2016). "A review of recent developments and technological advancements of variable-air-volume (VAV) air-conditioning systems." Renewable and Sustainable Energy Reviews 59: 784-817.

Price, C. and B. Rasmussen (2015). "HVAC nonlinearity compensation using cascaded control architectures." ASHRAE Transactions 121: 217.

Raisoni, R., N. S. Raman, P. Barooah, J. D. Munk and P. Im (2018). A control-oriented dynamic model of air flow in a single duct HVAC, Oak Ridge National Lab. (ORNL), Oak Ridge, TN (United States).

Shim, G., L. Song and G. Wang (2014). "Comparison of different fan control strategies on a variable air volume systems through simulations and experiments." Building and Environment 72: 212-222.

Shin, Y., Y. S. Chang and Y. Kim (2002). "Controller design for a real-time air handling unit." Control Engineering Practice 10(5): 511-518.

Singhal, A. and T. I. Salsbury (2007). "Characterization and Cancellation of Static Nonlinearity in HVAC Systems." ASHRAE Transactions 113(1).

Tahersima, F., J. Stoustrup and H. Rasmussen (2013). "An analytical solution for stability-performance dilemma of hydronic radiators." Energy and Buildings 64: 439-446.

Taylor, S. T. (2007). "VAV system static pressure setpoint reset." *ASHRAE journal* 6.

Underwood, C. P. (2002). *HVAC Control Systems: Modelling, Analysis and Design, Routledge.*

Wang, J. and Y. Wang (2008). "Performance improvement of VAV air conditioning system through feedforward compensation decoupling and genetic algorithm." *Applied Thermal Engineering* 28(5-6): 566-574.

Wu, Z., D. Li, Y. Xue and Y. Chen (2019). "Gain scheduling design based on active disturbance rejection control for thermal power plant under full operating conditions." *Energy* 185: 744-762.

Yang, Y. and Y. Yan (2016). "Attitude regulation for unmanned quadrotors using adaptive fuzzy gain-scheduling sliding mode control." *Aerospace Science and Technology* 54: 208-217.

Yueneng, Y. and Y. Ye (2018). "Backstepping sliding mode control for uncertain strict-feedback nonlinear systems using neural-network-based adaptive gain scheduling." *Journal of Systems Engineering and Electronics* 29(3): 580-586.

Zaheer-Uddin, M. and G. Zheng (1994). "A VAV system model for simulation of energy management control functions: off normal operation and duty cycling." *Energy Conversion and Management* 35(11): 917-931.

Zhou, X., N. Harberl and H. Cheng (2017). Demonstration of Energy Savings in Commercial Buildings for Tiered Trim and Respond Method in Resetting Static Pressure for VAV Systems, Iowa State University Ames United States.

The invention claimed is:

1. An air handling unit (AHU), comprising a pressure differential sensor, a supply fan having a motor controlled by a variable frequency drive, a gain-scheduling controller configured to receive a duct static pressure measured by the pressure differential sensor, and a fan speed from the variable frequency drive, and which comprises a scheduling function based on the duct static pressure and the fan speed determined by an equation:

$$g(H_{sp}, N) = \frac{H_{sp,r}}{H_{sp}} \cdot \frac{N}{N_r}$$

where $H_{sp}$ is the duct static pressure, and N is the fan speed, under a first reference condition, and where $H_{sp,r}$ and $N_r$ are, respectively, a duct static pressure and the fan speed under a second reference condition, and wherein the gain scheduling controller is configured to provide control signals based upon the scheduling function to the variable frequency drive coupled to the motor to control the motor thereby resulting in a desired control performance of the motor.

2. The air handling unit of claim 1, further comprising a duct, the supply fan having the fan speed and being configured to deliver air to the duct, and a pressure differential sensor configured to measure the duct static pressure within the duct.

3. The air handling unit of claim 2, wherein the pressure differential sensor is positioned between an upstream portion of the duct and a downstream portion of the duct, and wherein the duct static pressure reflects a pressure loss of the downstream portion of the duct.

4. The air handling unit of claim 1, wherein the fan and the duct are modeled by a fan duct gain being a ratio of a duct static pressure change within the duct to a fan speed change of fan speed, and wherein the scheduling function is a gain-scheduling function that is reversely proportional to the fan duct gain.

5. The air handling unit of claim 4, wherein the fan duct gain is calculated at a stable operation condition of the fan.

6. The air handling unit of claim 1, further comprising a variable frequency drive coupled to an induction motor of the fan, and wherein the gain-scheduling controller provides control signals to the variable frequency drive to control speed of the fan.

7. The air handling unit of claim 1, wherein the first reference condition is a predetermined amount of hertz.

8. The air handling unit of claim 1, wherein the second reference condition is a predetermined amount of pascals.

9. The air handling unit of claim 8, wherein the second reference condition is a static pressure setpoint rather than a measured value.

10. The air handling unit of claim 1, wherein the duct static pressure sensor is an existing duct static pressure sensor.

11. A method, comprising:

receiving duct static pressures within a duct of an air handling unit;

receiving fan speeds of a supply fan providing air into the duct; and controlling by a gain-scheduling controller providing control signals to a variable frequency drive coupled to the supply fan, the gain-scheduling controller comprising a scheduling function running on a component, the scheduling function adjusting the control signals based upon the duct static pressures and the fan speeds and wherein the scheduling function generates the control signals with an equation:

$$g(H_{sp}, N) = \frac{H_{sp,r}}{H_{sp}} \cdot \frac{N}{N_r}$$

where $H_{sp}$ is a duct static pressure selected from a group consisting of a measureable duct static pressure, which is measured by a duct static pressure sensor; and a duct static pressure setpoint, and N is the fan speed, which can be obtained from a fan speed feedback of a variable frequency drive (VFD), under a reference condition, and where $H_{sp,r}$ and $N_r$ are, respectively, a duct static pressure and a fan speed under a reference condition;

providing control signals, by the gain-scheduling controller, based upon the scheduling function to the variable frequency drive coupled to the motor to control the motor.

12. The method of claim 11, wherein receiving the duct static pressures are defined further as receiving the duct static pressures from a duct static pressure sensor in the duct.

13. The method of claim 11, wherein the fan speeds are a fan speed feedback provided by the variable frequency drive coupled to the fan.

14. The method of claim 11, further comprising modeling the fan and the duct by a fan duct gain being a ratio of a duct static pressure change within the duct to a fan speed change of fan speed, and wherein the scheduling function is a gain-scheduling function that is reversely proportional to the fan duct gain.

15. The method of claim 14, further comprising calculating the fan duct gain at a stable operation of the fan.

16. The method of claim 11, further comprising receiving, by the gain scheduling controller, control signals in a form of variable frequency drive frequency commands from a fixed gain controller, and adjusting the variable frequency drive frequency commands to generate the control signals.

17. The method of claim 16, wherein the gain scheduling controller multiplies each of the variable frequency drive frequency commands by a respective gain value to adjust the variable frequency drive frequency command and thereby generate the control signals.

18. A controller, comprising:

a fixed-gain controller operable to receive a first control signal indicative of a difference between a duct static pressure setpoint and a duct static pressure, the fixed-gain controller comprising circuitry operable to calculate a motive force frequency of a motive force generator based at least in part on the first control signal, the fixed-gain controller being further operable to provide a second control signal indicative of the motive force frequency; and a gain-scheduling controller operable to receive the second control signal, a third control signal indicative of the duct static pressure, and a fourth control signal indicative of a motive force speed of the motive force generator, the gain-scheduling controller comprising circuitry operable to calculate an adjusted motive force frequency based at least in part on a scheduling function:

$$g(H_{sp}, N) = \frac{H_{sp,r}}{H_{sp}} \cdot \frac{N}{N_r}$$

where $H_{sp}$ is the duct static pressure selected from a group consisting of the measured duct static pressure and the duct static pressure setpoint, N is the motive force speed, $H_{sp,r}$ is a reference duct static pressure, and $N_r$ is a reference motive force speed, the gain-scheduling controller being further operable to provide a fifth control signal indicative of the adjusted motive force frequency for controlling the motive force generator.

19. The controller of claim 18, wherein the motive force generator is selected from the group consisting of a fan operable to deliver air and a pump operable to deliver a liquid.

\*    \*    \*    \*    \*